(12) United States Patent
Sasaki et al.

(10) Patent No.: US 10,759,577 B2
(45) Date of Patent: Sep. 1, 2020

(54) PACKAGING CONTAINER

(71) Applicant: TOPPAN PRINTING CO., LTD., Tokyo (JP)

(72) Inventors: Noriyuki Sasaki, Tokyo (JP); Tomoko Matsumoto, Tokyo (JP)

(73) Assignee: TOPPAN PRINTING CO, LTD., Tokyo (JP)

( * ) Notice: Subject to any disclaimer, the term of this patent is extended or adjusted under 35 U.S.C. 154(b) by 0 days.

(21) Appl. No.: 15/853,589

(22) Filed: Dec. 22, 2017

(65) Prior Publication Data

US 2018/0194527 A1 Jul. 12, 2018

Related U.S. Application Data

(63) Continuation of application No. PCT/JP2016/003296, filed on Jul. 12, 2016.

(30) Foreign Application Priority Data

| Jul. 13, 2015 | (JP) | ................................ | 2015-139488 |
| Aug. 10, 2015 | (JP) | ................................ | 2015-158163 |
| Aug. 21, 2015 | (JP) | ................................ | 2015-163774 |

(51) Int. Cl.
*B65D 65/40* (2006.01)
*B65D 5/40* (2006.01)
(Continued)

(52) U.S. Cl.
CPC .............. *B65D 65/40* (2013.01); *B32B 3/266* (2013.01); *B32B 7/12* (2013.01); *B32B 27/10* (2013.01);
(Continued)

(58) Field of Classification Search
CPC . B65D 65/40; B65D 5/40; B65D 5/54; B65D 5/067; B65D 2565/387;
(Continued)

(56) References Cited

U.S. PATENT DOCUMENTS 3,905,646 A 9/1975 Brackmann et al.
4,848,589 A * 7/1989 Olson .................... B65D 5/068
229/122.1
(Continued)

FOREIGN PATENT DOCUMENTS

| JP | S5786929 U | 5/1982 |
| JP | 09-048426 | 2/1997 |

(Continued)

OTHER PUBLICATIONS

International Search Report Issued in International Patent Application No. PCT/JP2016/003296 dated Sep. 13, 2016.
(Continued)

*Primary Examiner* — Christopher R Demeree
(74) *Attorney, Agent, or Firm* — Foley & Lardner LLP

(57) ABSTRACT

A packaging container that can be easily disassembled is provided at low cost. The packaging container is formed by a laminate including a base layer being folded into a box shape and each end thereof being overlapped to be sealed with each other, the laminate having a fragile part formed thereon. The laminate further has, for example, a film layer, and includes, as a fragile part, a first scored part formed on a base layer and a second scored part formed on a film in a 2.0-mm-wide band area with the first scored part being a widthwise center.

7 Claims, 13 Drawing Sheets

(51) Int. Cl.
  *B65D 5/54* (2006.01)
  *B32B 27/32* (2006.01)
  *B32B 29/00* (2006.01)
  *B32B 3/26* (2006.01)
  *B32B 7/12* (2006.01)
  *B32B 27/10* (2006.01)

(52) U.S. Cl.
  CPC ............ *B32B 27/32* (2013.01); *B32B 29/002* (2013.01); *B32B 29/005* (2013.01); *B65D 5/40* (2013.01); *B65D 5/54* (2013.01); *B32B 2255/205* (2013.01); *B32B 2307/31* (2013.01); *B32B 2439/62* (2013.01); *B32B 2439/70* (2013.01); *B65D 2565/387* (2013.01)

(58) Field of Classification Search
  CPC ...... B65D 5/542; B65D 5/5445; B65D 5/563; B32B 3/266; B32B 7/12; B32B 27/10; B32B 27/32; B32B 29/002; B32B 29/005
  USPC ............ 229/206, 125.42, 249, 915.1, 101.2, 229/117.01, 235, 237, 214, 240, 5.82, 229/5.84
  See application file for complete search history.

(56) References Cited

U.S. PATENT DOCUMENTS

| | | | | |
|---|---|---|---|---|
| 6,427,908 | B1* | 8/2002 | Laker | B65D 5/068 229/125.42 |
| 6,592,024 | B2* | 7/2003 | Laker | B65D 5/068 229/125.42 |
| 8,814,034 | B2* | 8/2014 | Dickie | B65D 5/746 206/459.5 |
| 9,873,544 | B1* | 1/2018 | Muhammad | B65D 5/48048 |
| 2009/0297741 | A1 | 12/2009 | Oshita et al. | |
| 2014/0272352 | A1 | 9/2014 | Tilton | |
| 2017/0267395 | A1* | 9/2017 | Kansburg | B65D 5/068 |
| 2018/0289564 | A1* | 10/2018 | Sheehan | B65D 75/52 |

FOREIGN PATENT DOCUMENTS

| | | |
|---|---|---|
| JP | 10-029279 | 2/1998 |
| JP | 10-278928 H | 10/1998 |
| JP | 2002-332054 | 11/2002 |
| JP | 2003-312650 | 11/2003 |
| JP | 2003-335362 | 11/2003 |
| JP | 3729367 B2 | 12/2005 |
| JP | 3843510 | 11/2006 |
| JP | 2010-222041 | 10/2010 |
| JP | 2011-006075 | 1/2011 |
| JP | 2013-203454 A | 10/2013 |
| JP | 2013-204173 | 10/2013 |
| JP | 2016-060537 | 4/2016 |
| WO | WO-2006/075622 | 7/2006 |

OTHER PUBLICATIONS

Extended European Search Report dated May 24, 2018 in corresponding application No. 16824073.7.

European Office Action dated Apr. 3, 2019 in corresponding application No. 16824073.7.

Taiwanese Office Action dated Jul. 30, 2019 for corresponding Application No. 105121989 (11 pages).

* cited by examiner

INNER LAYER SIDE OF CONTAINER

PACKAGING CONTAINER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/003296, filed Jul. 12, 2016, which is based upon and claims the benefit of priority of Japanese Patent Application No. 2015-139488, filed Jul. 13, 2015, Japanese Patent Application No. 2015-163774, filed Aug. 21, 2015, and Japanese Patent Application No. 2015-158163, filed Aug. 10, 2015, the entireties of which are incorporated by reference.

TECHNICAL FIELD

The present invention relates to a packaging container such as a liquid paper container.

BACKGROUND ART

Liquid paper containers for food and non-food liquid content, typically milk, are widely used. These containers use paper as a base material and made of a laminate in which a thermoplastic resin sealant layer is provided on an inner surface thereof. Liquid paper containers are also widely used for liquid food products such as fruit and other kinds of juice beverages, tea, coffee, milk, and soup, and alcoholic beverages such as sake (rice wine) and shochu (distilled spirit).

Some of these liquid paper containers are constituted by a paper base material and a sealant layer, but others have a gas barrier layer by use of an aluminum foil, a metal-deposited film, a metal-oxide-deposited film or other types between the paper layer and the sealant layer, or have a layer with gas barrier properties, such as an inorganic-compound-deposited film (see, for example, PTL 1).

Paper containers are widely used by virtue of their convenience and economy, and are common as packaging containers for various products. In recent years, containers are required to be less voluminous when they are disposed of from the viewpoint of environmental conservation. In addition, there is a change in consumers' awareness, as demonstrated by the fact that a mechanism for recycling the containers as a resource is being established. Under such circumstances, for example, used milk cartons are disassembled by consumers for recycling before being placed on a sorting collection route. In addition, even containers that are not collected for recycling are often disassembled and made less voluminous before being disposed of.

However, there is a problem at a time of actual disassembly of the containers. For a liquid paper container provided with a spout on the roof plate of a gable-roof-shaped top part, for example, there is practically no other choice but to open the top sealing part and cut around the spout with scissors or the like to take the spout off for disposal because the spout is firmly welded.

Furthermore, in the conventional liquid paper container described above, the top sealing part is firmly sealed by thermal fusion, which on occasions forces people to struggle to open the top sealing part by hand to disassemble the container after the container is emptied.

This is because the top sealing part of the liquid paper container is sealed with a bent laminate being abutted, which is likely to allow a gap, so that a highly flowable polyethylene resin is used on a sealant layer on the rear surface of the liquid paper container and sealed with a high temperature and a strong pressing force so as to fill and completely seal the gap.

Such circumstances are the reasons for the firm sealing. Lowering the sealing temperature or weakening the pressing pressure to reduce the sealing strength may possibly result in incomplete sealing, which may in turn cause a liquid leakage.

Rather than opening the top sealing part, cutting an opening of a spout with scissors can also disassemble an empty container, but cutting a hard spout or its surroundings with scissors accompanies significant trouble and is cumbersome because the method requires a tool, and therefore are not practiced commonly.

An improvement to this situation is a liquid paper container that allows a side plate of the body part thereof to be cut and torn to trigger easy disassembly.

For example, PTL 2 discloses a liquid paper container where both ends of a composite sheet provided with a synthetic resin layer on the front and rear sides of a paper layer are overlapped with each other, and a pull tab is provided at an end of the composite sheet on the outer surface side of a sealed part for bonding the body part, the pull tab being peelably provided via a peeling layer of a easily peelable tape-like film. This tape-like film is provided continuously along an inner surface of a four-side surface plate, and has a cutting line, such as a cut line, a half cut line, and a perforated line, engraved on a paper layer of the composite sheet along both widthwise edges of the tape-like film.

This proposed liquid paper container in PTL 2, however, requires an easily peelable tape-like film and poses a risk that the sealing on the body sealing of the part for bonding the body part weakens due to the peelability of the tape-like film. Thus there is a demand for further improvement in ease of disassembly of a used container or for another method that simplifies disassembling thereof.

CITATION LIST

Patent Literature

[PTL 1] JPA 2003-335362
[PTL 2] JP 3843510

SUMMARY OF THE INVENTION

Technical Problem

The liquid paper container of PTL 2, however, requires an easily peelable tape-like film and poses a risk that the sealing of the part for bonding the body part weakens due to the peelability of the tape-like film. A possible solution is to provide scoring for a base film of a barrier layer, such as an aluminum deposited film or an inorganic oxide deposited film, rather than to an easily-peelable tape-shaped film. Depending on how to provide the scoring, however, this solution may impair the barrier property, and therefore further improvement is desired.

The present invention has been made in view of such circumstances, and aims to provide a liquid paper container that does not use an easily-peelable tape-like film, nor impairs the gas barrier property, but can be easily disassembled, provides stable sealing and is hard to break.

Solution to Problem

One aspect of the present invention for solving the problems mentioned above is a packaging container formed by a laminate including a base layer being folded into a box shape and each end thereof being overlapped to be sealed with each other, the laminate having a fragile part formed thereon.

Advantageous Effects of the Invention

The present invention makes it possible to provide at low cost a packaging container that can be easily disassembled.

DESCRIPTION OF THE EMBODIMENTS

First Embodiment

A packaging container according to a first embodiment of the present invention will be hereinafter described with reference to the drawings. In the modified examples, descriptions of elements identical or corresponding to those of the embodiments will be omitted as appropriate. More generally, the description of the embodiments are intended to be representative of the present invention, and the invention is not limited to the embodiment and Examples described herein.

(Packaging Container)

Figure 1:
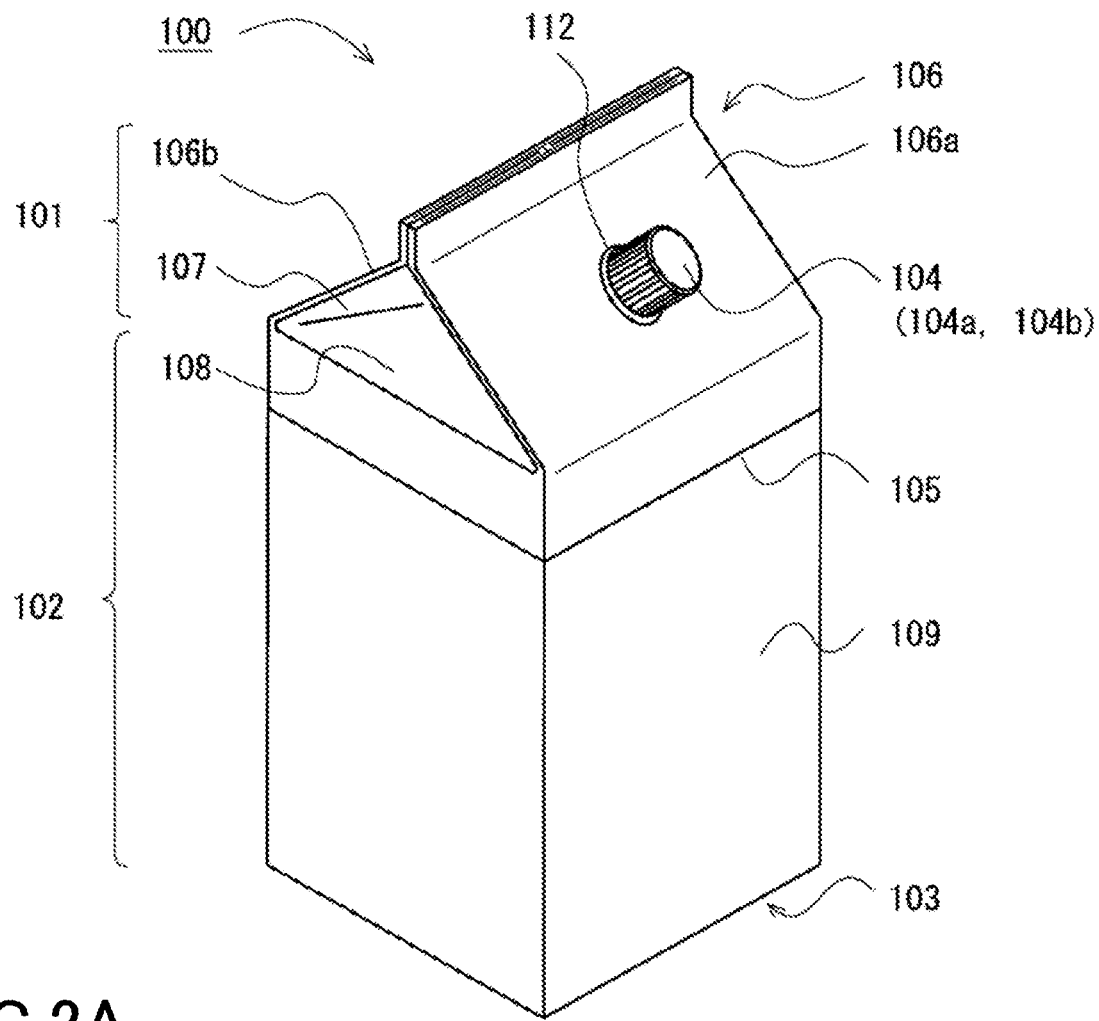
FIG. 1 is a perspective view of a packaging container according to an embodiment of the present invention.

FIG. 1 shows a perspective view of a packaging container according to an embodiment of the present invention. A packaging container 1 includes a container body 100 and a spout plug 104, a resin pouring tool, the container body 100 being formed by a blank, a processed sheet material, being folded into a box shape, and ends thereof being overlapped and sealed with each other. The container body 100 includes a top part 101 that serves as an upper part when the container body 100 stands upright, a body part 102 that serves as a side surface, and a bottom part 103 that serves as a bottom part. The top part 101 includes two roof plates 106 (106a, 106b), an infolding plate 107 that is folded in between the roof plates 106, and an outfolding plate 108. A circular spout aperture 112 is formed on the roof plate 106a. The spout plug 104 includes a spout 104a and a cap 104b and is attached to the spout aperture 112. The body part 102 is constituted by four side plates 109. In a vicinity of the top part 101 of the side plate 109, a fragile part 105 having a lowered breaking strength is formed in a width direction, a lateral direction at a time when the container body 100 stands upright.

(Disassembling Method)

Figure 2A:
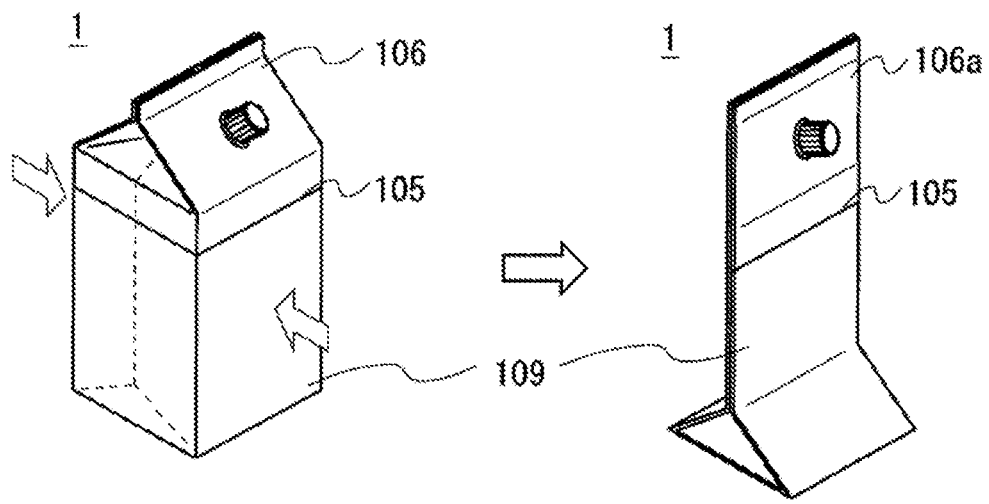
FIG. 2A shows a method of disassembling a packaging container according to an embodiment of the present invention.
Figure 2B:
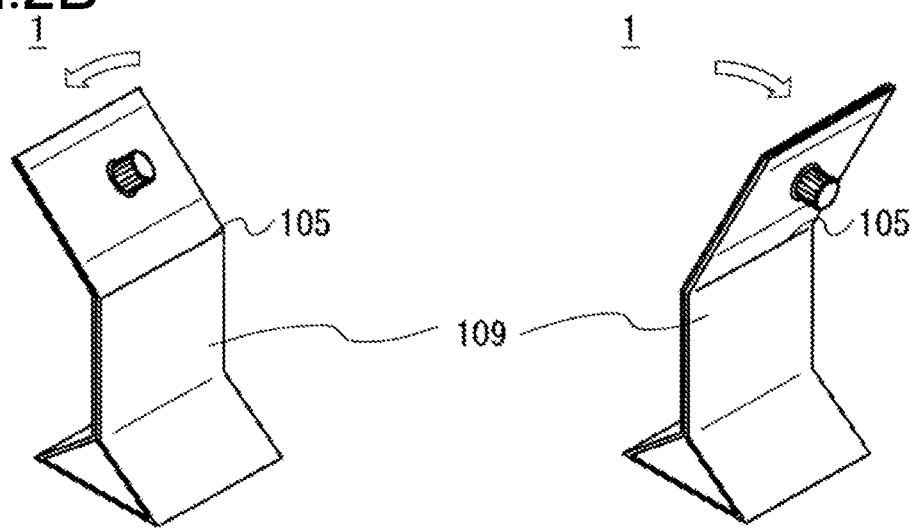
FIG. 2B shows a method of disassembling a packaging container according to an embodiment of the present invention.
Figure 2C:
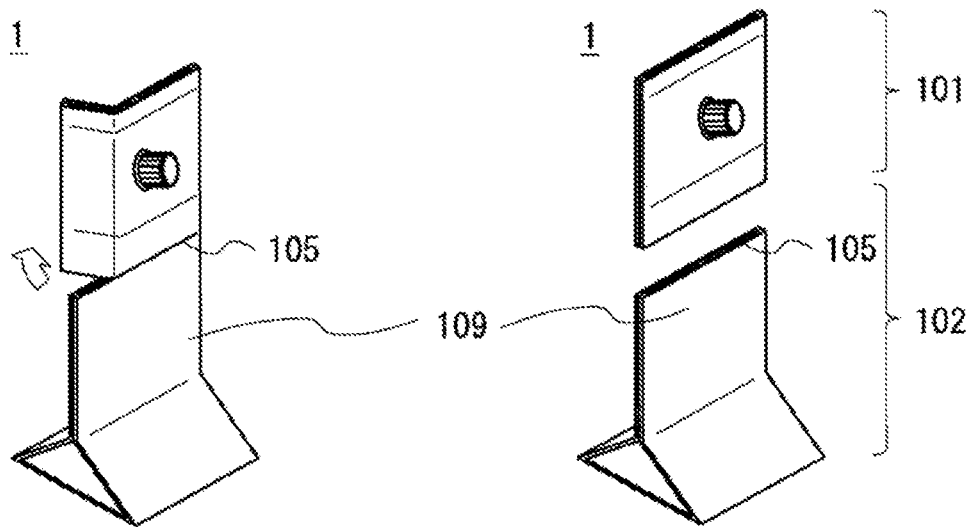
FIG. 2C shows a method of disassembling a packaging container according to an embodiment of the present invention.

FIGS. 2A, 2B, and 2C show a method of disassembling the packaging container 1.

Each step of the method of disassembling the packaging container 1 will be described with reference to FIGS. 2A, 2B, and 2C.

<Crushing Process>

FIG. 2A shows a step of crushing the packaging container 1. In this step, a user of the packaging container 1 crushes the body part 102 by pushing the two opposed side plates 109 extending below the roof plate 106 in a direction to make these side plates contact each other. The two side plates 109 in contact with the side plate 109 to be crushed are folded toward an inside of the packaging container 1.

<First Folding Process>

Shown on the left side of FIG. 2B is a process of folding the packaging container 1 along the fragile part 105. In this step, the user folds the side plate 109 along the fragile part 105.

<Second Folding Process>

Shown on the right side of FIG. 2B is a process of breaking the packaging container 1 along the fragile part 105. In this step, the user folds the side plate 109 along the fragile part 105 in a direction opposite to that in the previous step. The side plate 109 may be folded a plurality of times in each direction.

This step proceeds with the breakage of the fragile part 105. Noted that, in a circumstance where the first folding step has broken the fragile part 105 over a sufficient range, this step may be skipped.

<Roof Plate Separation Process>

FIG. 2C shows a step of separating a part of the side plate 109 from the packaging container 1 along the fragile part 105. In this step, the user tears part of the side plate 109 along the fragile part 105 to separate from the packaging container 1. Since the fragile part 105 is at least partially broken in the preceding step, the user can separate the upper part of the side plate 109 with only a slight force from the fragile part 105 that serves as a starting point. As shown on the right side of FIG. 2C, the separated packaging container 1 is disassembled with the upper part of the body part 102 and the top part 101 being separated from the lower part of the body part 102.

(Blank)

Figure 3:
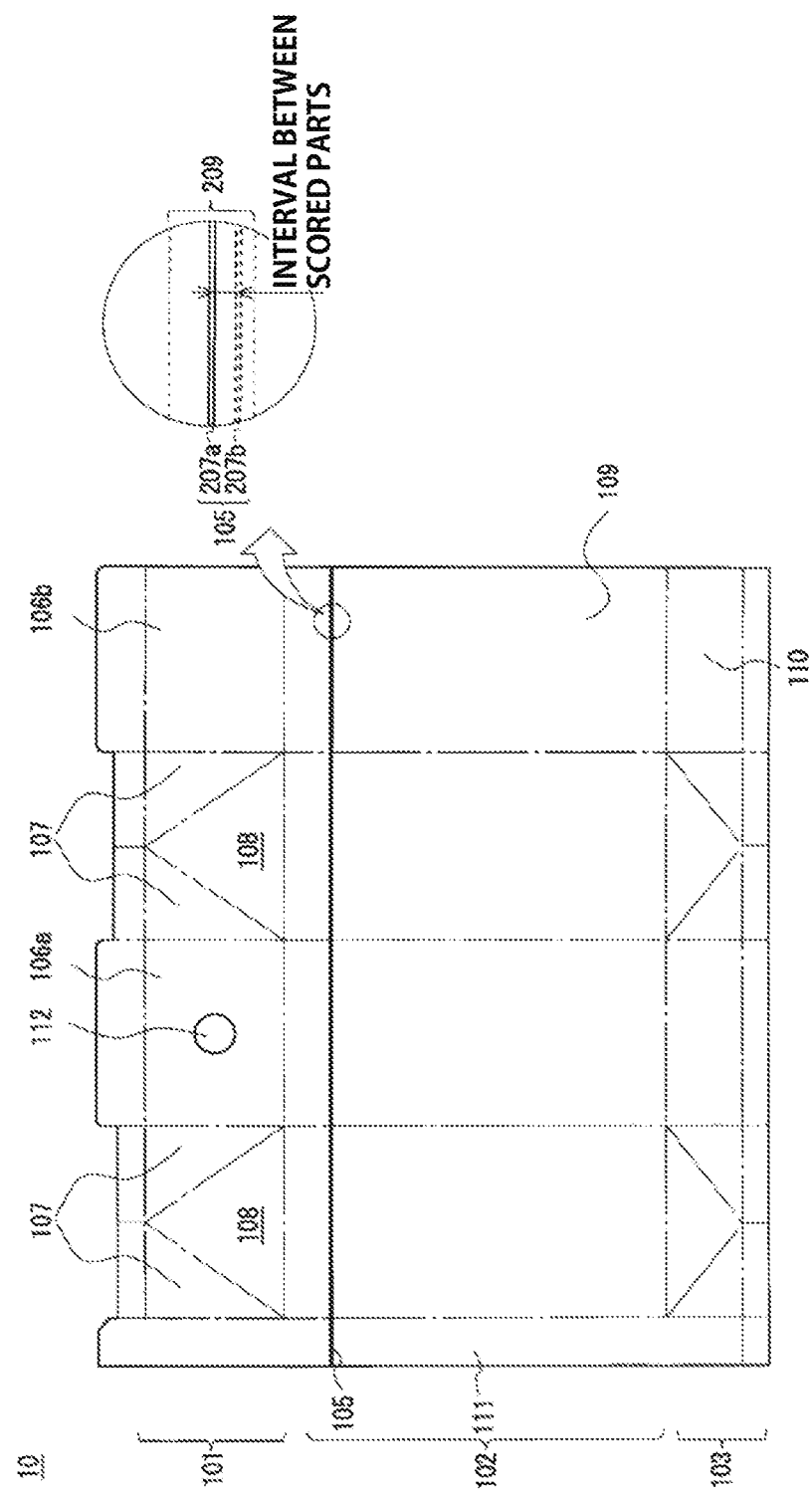
FIG. 3 is a plan view and partially enlarged view of a blank according to an embodiment of the present invention.

FIG. 3 is a plan view of a blank 10, an example of a blank that serves as material for the container body 100. The blank 10 has roof plates 106a and 106b constituting the top part 101, the infolding plate 107 and the outfolding plate 108, the four side plates 109 constituting the body part 102, a bottom surface plate 110 constituting the bottom part 103, and a sealing part 111 formed at an end thereof. Folding the blank 10 along the one-dot chain line in FIG. 3 and sealing the sealing part 111 to an opposite end form the blank 10 into the box-shaped container body 100. Near the center of the roof plate 106a, the spout aperture 112 for inserting and fixing the spout plug 104 is formed. In a vicinity of the top part 101 of the side plate 109, the linear fragile part 105 is formed substantially all along a periphery in a width direction, a lateral direction when the container body 100 stands upright.

FIG. 3 is an enlarged plan view of and the fragile part 105 and scored parts 207a, 207b constituting the fragile part 105. As described later, in a plan view of the blank 10 or a sheet material 200, the scored part 207b is formed in a 2.0-mm-wide virtual band area 209 with the scored part 207a being a widthwise center.

(Sheet Material)

Figure 4:
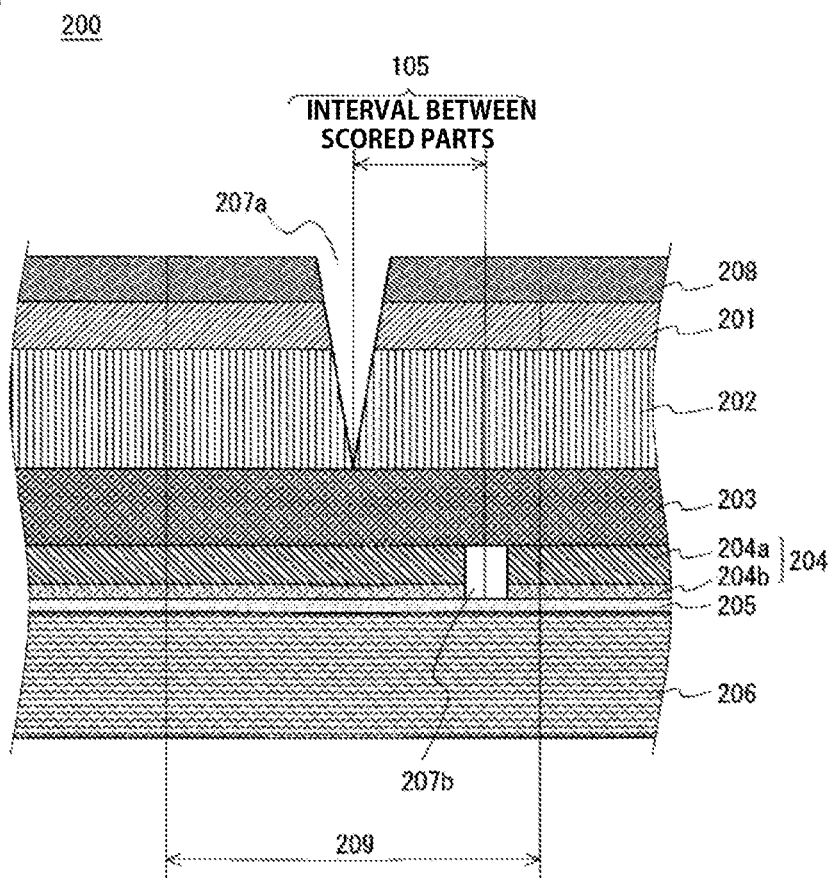
FIG. 4 is a cross-sectional view of a laminated structure of a sheet material according to one embodiment of the present invention.
Figure 5:
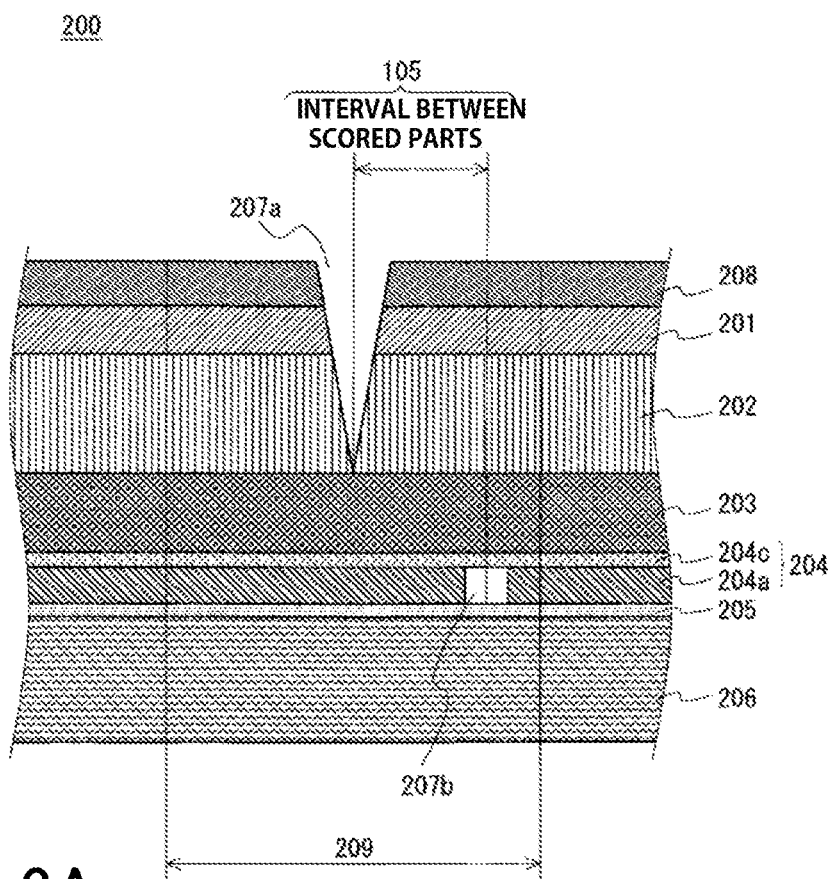
FIG. 5 is a cross-sectional view of a laminated structure of a sheet material according to one embodiment of the present invention.

FIGS. 4 and 5 are sectional views each schematically illustrating an example of a laminated structure of the sheet material 200, a laminate for the blank 10. The sheet material 200 has a print layer 208, a thermoplastic resin layer 201, a paper base layer 202, an adhesive resin layer 203, a base film layer 204, an adhesive layer 205, and a sealant layer 206 sequentially from an outside to an inside of the packaging container 1. Differences between the example shown in FIG. 4 and the example shown in FIG. 5 will be described later.

The thermoplastic resin layer 201 can be formed on the paper base layer 202 by, for example, extrusion lamination by use of a low-density polyethylene resin (LDPE), a linear low-density polyethylene resin (LLDPE), and the like.

On an outer side of the thermoplastic resin layer 201, a print layer 208 may be provided to display a pattern or product information. The print layer 208 can be formed by a method such as gravure printing and offset printing by use of well-known ink. Applying a corona treatment or other easy adhesion treatment to the thermoplastic resin layer 201 can improve adhesion to the print layer 208. An overcoat layer may be provided on the outer side of the print layer 208 for better wear resistance or surface decorativeness.

For the paper base layer 202, paperboard such as milk carton base paper can be used. Basis weight and density of the paperboard can be selected as appropriate according to a capacity and design of the container. For example, paperboard having a basis weight between 200 g/m2 and 500 g/m2 and a density between 0.6 g/cm3 and 1.1 g/cm 3 can be used.

The adhesive resin layer 203 is a layer made of a polyolefin resin having a function of adhering the paper base layer 202 and the base film layer 204. More specifically, high density polyethylene resin (HDPE), medium density polyethylene resin (MDPE), LDPE, LLDPE, ethylene-methacrylic acid copolymer (EMAA), ethylene/acrylic acid copolymer (EAA), ionomer, polypropylene (PP) and others can be used. Corona treatment, ozone treatment, anchor coating and other treatment may be applied to a surface of the paper base layer 202 or the base film layer 204 for additional adhesive strength. Alternatively, an adhesive layer by use of, for example, a dry lamination adhesive may be used, instead of the adhesive resin layer 203. The lamination adhesive preferably has a 10 to 60 μm thickness. A thickness of 10 μm or more can give sufficient adhesive strength.

Available as the base film layer 204 is a deposited film including a deposited layer 204b and the base film 204a, or a laminated film, where an aluminum and other metal foil 204c is dry-laminated on the base film 204a, the deposited layer 204b being deposited aluminum or other metal, silica, and alumina and others. In the example shown in FIG. 4, the base film layer 204 is a deposited film, and consists of the base film 24a and the deposited layer 204b provided on an inner surface of the packaging container 1. The deposited layer 204b may have a thickness between 5 nm and 100 nm, or between 6 µm and 25 µm on an occasion when polyethylene terephthalate is used for the base film 204a. The polyethylene terephthalate layer is preferably approximately 12 µm thick from a viewpoint of ease of the laser irradiation process described below.

In the example shown in FIG. 5, the base film layer 204 is a laminated film, and consists of the base film 204a and the metal foil 204c provided on the outer surface of the packaging container 1. On an occasion when the laminated film is used and the scored part 207b is formed with laser irradiation, the material film layer 204 is laminated so that the deposited layer 204b or the metal foil 204c faces the adhesive resin layer 203, as shown in FIG. 4, so as to prevent the metal foil 204c from shielding the laser irradiation on the base film 204a. Also available as the base film layer 204 is a barrier-coated polyethylene terephthalate film or a barrier film made of EVOH and other barrier material. When using a film in which an aluminum foil that serves as the metal foil 204c is dry-laminated on a polyethylene terephthalate film that serves as the base film 204a, the aluminum foil may have a thickness between 5 µm and 15 µm and the polyethylene terephthalate layer may have a thickness between 6 µm and 25 µm. The polyethylene terephthalate layer is preferably approximately 12 µm thick from a viewpoint of ease of the laser irradiation process described below.

In either case, a nylon, polypropylene (PP), and other resin film can be used for the base film 204a, as well as polyethylene terephthalate (PET). In particular, a biaxial oriented film of PET is preferable because it expands and shrinks little at a time of an evaporation process and a bonding process.

An adhesive for dry lamination or non-solvent lamination may be applied to the adhesive layer 205, or carrying out an adhesion process on a polyolefin resin for adhesion. The adhesive is preferably applied with an amount between 0.5 g/m2 and 7.0 g/m2.

Available as the sealant layer 206 are HDPE, MDPE, LDPE, LLDPE, and the like. The sealant layer 206 may partially include a layer containing polybutene. Among the materials mentioned above, LLDPE is most preferable. Particularly preferable is LLDPE having a density of 0.925 g/cm3 or less and an MI (melt index) of 4 or more. Particularly preferable as the sealant layer 26 is a non-oriented film formed by a T-die method or an inflation method.

(Fragile Part)

On the sheet material 200, a fragile part 105 is formed, the fragile part being constituted by groove-shaped scored parts 207a, 207b formed with a predetermined depth at least on the paper base layer 202 and the base film layer 204. The scored part 207a may be formed at least on the paper base layer 202, or may be formed on the thermoplastic resin layer 201 and the print layer 208, both of which are laminated on an outer side of the paper base layer 202, as shown in FIGS. 4 and 5. The scored part 207b is desirably formed with a depth that does not penetrate the base film layer 204 but may penetrate the base film layer 204 to a partial extent because penetrating the base film layer 204 in a narrow range has little influence on barrier properties thereof.

The scored part 207a can be formed with a depth and shape that allows the paper base layer 202 to ensure strength of the packaging container 1. For example, a half blanking process and a full blanking process by use of a blade die can be used to form the scored part 207a. In addition, the scored part 207a may be formed in a perforated shape.

The scored part 207b can be formed by laser irradiation process as long as the base film layer 204 has been bonded thereto, whereas half-blanking and full-blanking can be used on an occasion when the scored part 207b is formed before the base film layer 204 is bonded thereto. The scored part 207b may be formed by the laser processing even if it is provided before the base film layer 204 is bonded thereto. The scored part 207b may also be formed in a perforated shape to ensure strength thereof.

As shown enlarged in FIG. 3, in the plan view of the sheet material 200, the scored part 207b is formed in a 2.0-mm-wide virtual band area 209 with the scored part 207a being a widthwise center. In other words, the scored part 207a and the scored part 207b are spaced apart from each other by 1.0 mm or less in the plan view. The scored part 207a and the scored part 207b are formed so as to be substantially parallel to each other.

As described above, the user folds and breaks the side plate 109 along the fragile part 105 when disassembling the packaging container 1. Thus in order to break the side plate 109 with less load, the scored part 207b is preferably formed to overlap with the scored part 207a in the plan view. However, forming the scored part 207b to always overlap with the scored part 207a requires fine adjustment of an manufacturing facility because a margin of error in bonding each layer constituting the sheet material 200, a margin of error in a location where the scored parts 207a and 207b are formed, and other margins of error occur in manufacturing blanks. This causes the cost of manufacturing the packaging container 1 to rise. Thus in the blank 10, forming the scored part 207b in the 2.0-mm-wide virtual band area 209 with the scored part 207a being the center in the width direction in the plan view of the sheet material 200 makes it possible to prevent the cost of manufacturing the packaging container 1 from rising while restraining the load required for breaking the side plate 109. Note that the scored parts 207a and 207b may not be formed by the method described above, but by another method.

(Modified Example of Fragile Part)

Figure 6A:
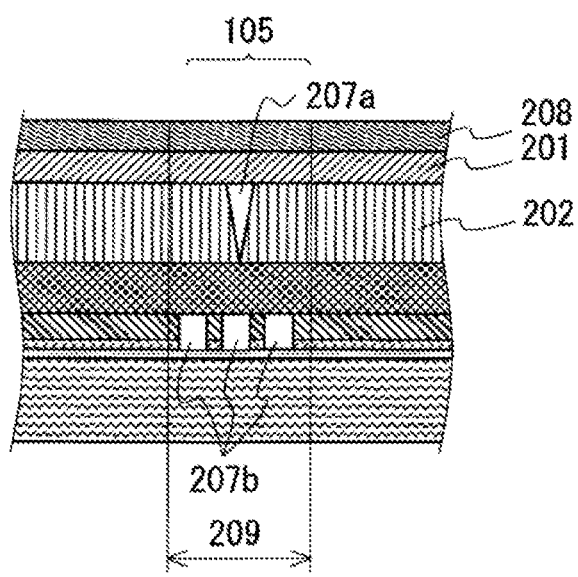
FIG. 6A is a cross-sectional view of a sheet material showing a modification of a fragile part according to an embodiment of the present invention.
Figure 6B:
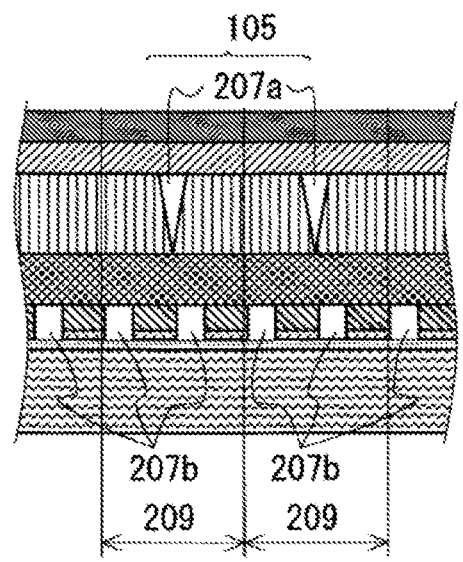
FIG. 6B is a cross-sectional view of a sheet material showing a modification of a fragile part according to an embodiment of the present invention.
Figure 6C:
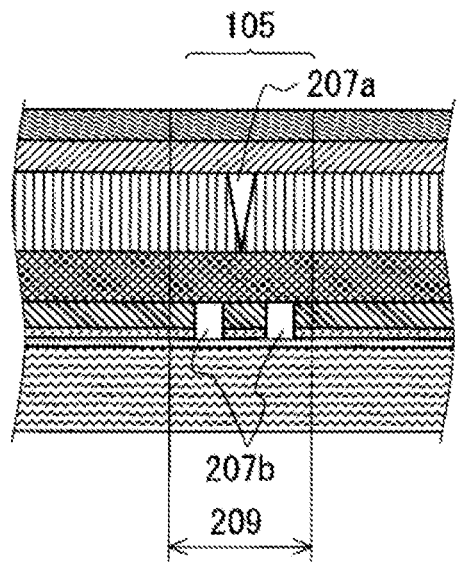
FIG. 6C is a cross-sectional view of a sheet material showing a modification of a fragile part according to an embodiment of the present invention.

A plurality of scored parts 207a and 207b may be formed. In addition, the thermoplastic resin layer 201 may be laminated on the paper base layer 202 after the scored part 207a is formed, and the scored part 207a may not be formed in the thermoplastic resin layer 201 and the print layer 208. FIG. 6A, FIG. 6B, and FIG. 6C show such a modified example of the fragile part. FIG. 6A shows a fragile part in which three scored parts 207b are formed while one scored part 207a is formed. FIG. 6B shows a fragile part in which six scored parts 207b are formed while two scored parts 207a are formed. FIG. 6C shows a fragile part in which two scored parts 207b are formed while one scored part 207a are formed. The scored parts 207b are preferably spaced apart from each other by 0.1 mm to 2.0 mm. Forming the plurality of scored parts 207b at this interval makes it even easier to form one of the plurality of scored parts 207b within the band area 209 without fine adjustment of manufacturing facilities, thereby making it possible to prevent the cost for manufacturing the packaging container 1 from rising.

Second Embodiment

A second embodiment of the present invention will be described in detail hereinafter with reference to the drawings. However, the present invention is not limited only to this embodiments or any of the other embodiments or Examples.

Figure 7:
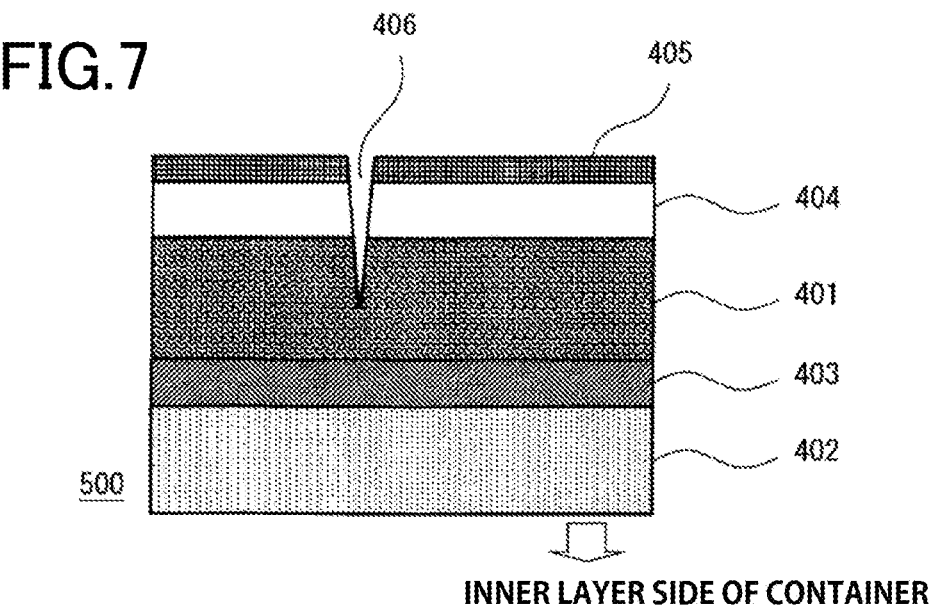
FIG. 7 is a partial cross-sectional schematic view for describing one embodiment of a laminate for a liquid paper container according to the present invention.

FIG. 7 is a partial cross-sectional schematic view for describing one embodiment of a laminate for a liquid paper container according to the present invention. A laminate 500 has a paper base material 401 and has a sealant layer 402 on a layer side of the container via an adhesive layer 403. A thermoplastic resin layer 404 is provided on an outer layer side of the paper base material, and a print layer 405 is provided on an outermost layer.

In the present embodiment, a fragile part is provided on the paper base material in order to disassemble the liquid container after it is used. The fragile part is constituted by a scored part 406 extending from the outer layer side of the laminate to the paper base material. Folding this fragile part to start with the scored part 406 to cut and separate the laminate apart can disassemble the container. The present invention uses paper having a moisture percentage of less than 9% for the paper base material 401.

Figure 8:
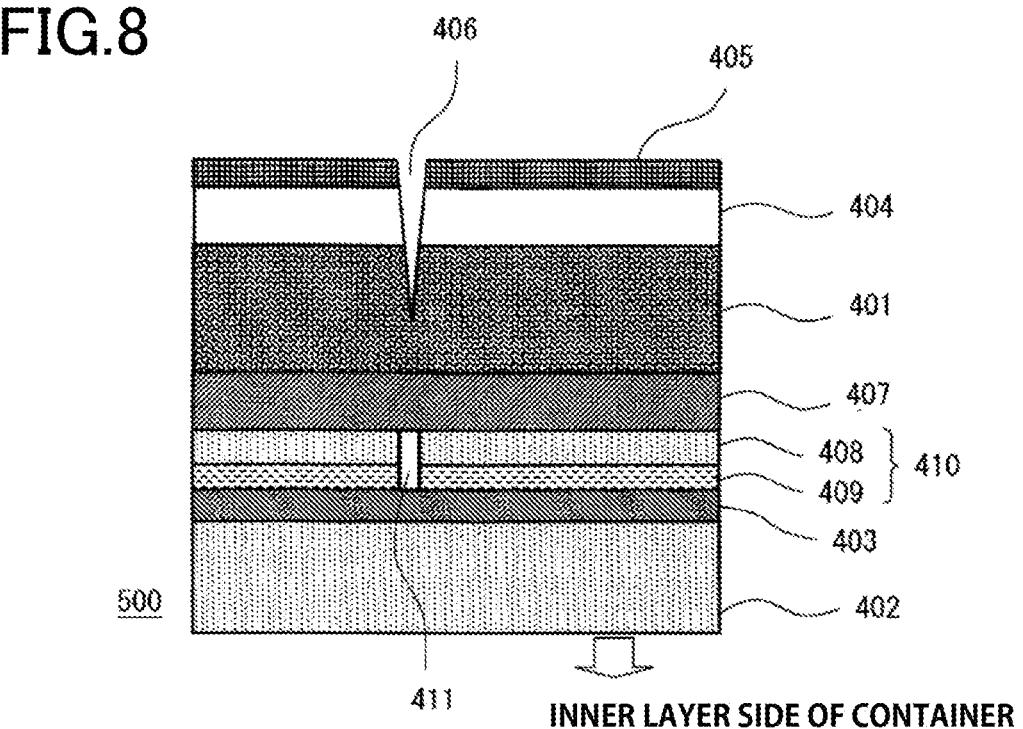
FIG. 8 is a partial cross-sectional schematic view for describing another embodiment of a laminate for a liquid paper container according to the present invention.

FIG. 8 is a partial cross-sectional schematic view for describing another embodiment of the laminate for a liquid paper container according to the present embodiment. In the laminate 500 shown here, the paper base material is bonded to a gas barrier layer 410 via an adhesive layer 407, the gas barrier layer 410 is constituted by a plastic film layer 408 and an inorganic compound layer 409. A sealant layer 402 is provided on an inner layer side of the laminate via an adhesive layer 403.

A thermoplastic resin layer 404 is provided on an outer layer side of the paper base material 401, and a print layer 405 is provided on an outermost layer. In the example shown here, the fragile part is constituted by the scored part 406 and a scored part 411, both of which are being provided at an identical location, the scored part 6 extending from the outer layer side of the container to the paper base material 401 and a scored part 411 being provided in the gas barrier layer 410. Folding this fragile part to start with the scored part 406 and a scored part 411 to cut and separate the laminate apart can disassemble the container. The present embodiment uses paper having a moisture percentage of less than 9% for the paper base material 401.

Figure 9:
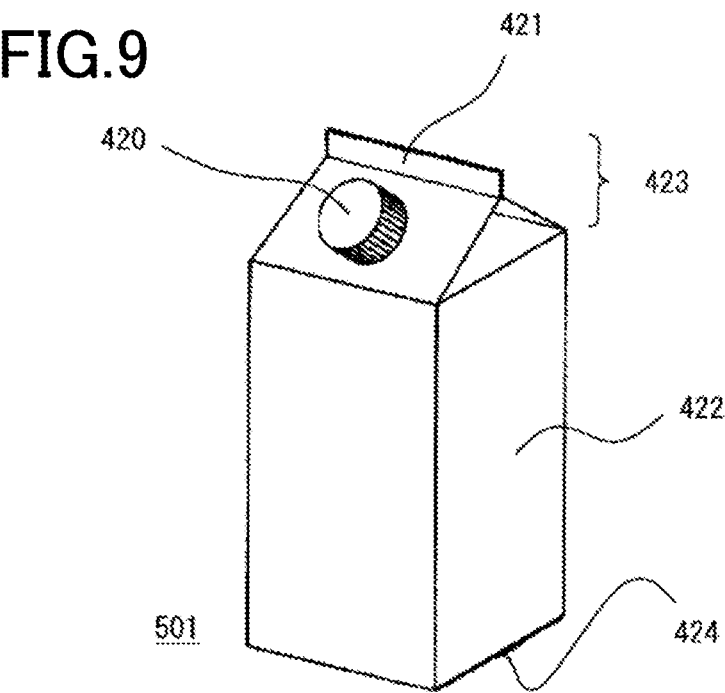
FIG. 9 is a schematic perspective view of one embodiment of a liquid paper container according to the present invention.

FIG. 9 is a schematic perspective view of one embodiment of a liquid paper container according to the present embodiment. The liquid paper container 501 shown in the present embodiment is called a gable-top paper container for storing milk and other liquid, which consists of a top part 423, a body part 422, and a bottom part 424. The top part 423 has a roof-shaped slope with a top sealing part 421 serving as a vertex, and has a spout 420 for pouring out contents included therein.

Figure 10:
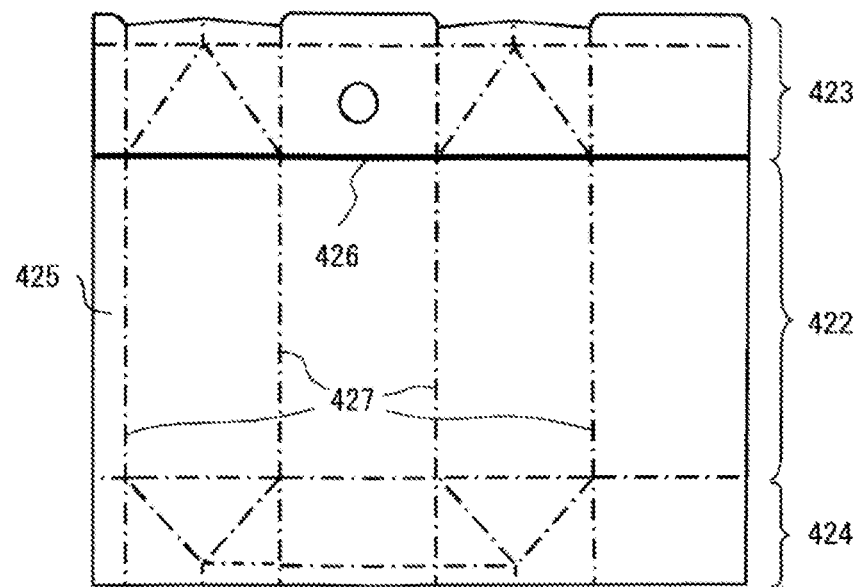
FIG. 10 is a planar development view of one embodiment of a liquid paper container according to the present invention.

FIG. 10 is a planar development view of one embodiment of a liquid paper container according to the present embodiment. This is a planar development view of the liquid paper container shown in FIG. 9. Forming a liquid container from the development view involves forming a quadrangular prism of the body part 422 by use of an attachment plate 425 and a folding line 427, and forming the top part 423 and the bottom part 424 by use of the other fold lines. At a time of provision of a fragile part on the body part, providing the fragile part 426 by, for example, scoring can easily cut and separate the top part 423 and the body part 422 apart.

Each component constituting the liquid paper container according to the present embodiment will be described in detail hereinafter individually with reference to the drawings.

The liquid paper container according to the present embodiment uses paper having a moisture percentage of less than 9% for the paper base material 401. This is what the inventor discovered during the course of intensively studying a constitution of a liquid paper base material that can be easily disassembled. When using a paper base material in with this moisture percentage range, the scored part constituting the fragile part is damaged when it is subject to a folding and other force, thereby making it possible to cut and separate the laminated body and easily disassembles the liquid paper container. Note that the moisture percentage can be measured with a heat drying type moisture meter.

A 9% or more moisture percentage of the paper base material cannot sufficiently damage the scored part, therefore making it hard to achieve easy disassembly. This is assumed to be because a higher moisture percentage causes paper to expand and therefore cannot sufficiently damage the scored part. In addition, a high moisture percentage of paper may possibly induce pinholes in a process of assembling the liquid paper container or of sealing the liquid paper container after the container is filled with liquid therein due to evaporation of internal moisture caused by a heat-up with hot air.

In contrast, a low moisture percentage of the paper, such as less than 5%, may possibly pose a risk that cracks or tearing may occur at a location of the paper where folding lines gather because the paper fails to expand, though the low moisture percentage ensures disassembling properties. The moisture percentage is therefore desirably 5% or more. The moisture percentage of the paper of the paper base material according to the present embodiment is in a range below 9%, more preferably in a range from 5% to 8%.

The moisture percentage of the paper hardly changes even after the processes of manufacturing, filling and sealing the paper container because the laminated material is sandwiched between the thermoplastic resin layer and the sealant layer. In the present embodiment, therefore, using paper with a moisture percentage below 9% as a material of the laminate can make the liquid paper container easy to disassemble after it is used.

Generally used as the paper base material 401, although not particularly limited thereto, is paperboard such as milk carton base paper. A basis weight and density of the base paper material are appropriately selected according to a capacity and design of the container, but paper with a basis weight of 200 to 500 g/m2 and a density of 0.6 to 1.1 g/cm3 is normally preferred.

The fragile part can be formed by provision of a scored part 406 extending from the outer layer side of the laminate 500 to the paper base material 401. In a circumstance where the laminate includes a gas barrier layer, the scored part 411 formed on the gas barrier layer as well at a location identical to scored part 406 can serve as a fragile part of the laminate.

The scoring provided on the paper base material 401 can be formed by a laser irradiation process, a semi-punching or full-punching process by use of a blade die, for example. In a circumstance where the laminate includes a gas barrier layer, the fragile part is constituted by scoring on the paper base material and scoring provided on the gas barrier layer at a location identical to the scored part on the paper base material. The scoring provided on the gas barrier layer can be formed by a laser irradiation process, a semi-punching or full punching process by use of a blade die.

The fragile part is provided on the body part 422 of the liquid paper container 501 by way of example, but can be provided at any place. However, providing the fragile part, for example, at a boundary between the body part and the top part is advantageous in that the fragile part overlaps the fold line, so that folding the container along the fold line after use thereof damages the fragile part, which provides high working efficiency, and that the fragile part makes it possible to easily separate apart the top part to which a spout and other plastic part is adhered, which is suitable for disassembly for recycling and other purposes.

A sealant layer 402 is provided on an inner layer of a container made of the laminate 500. The sealant layer makes it possible for the laminate to form a three-dimensional box shape and to seal the container after content is filled. A polyolefin resin is generally used for the sealant layer.

More specifically, examples of the polyolefin resin include low-density polyethylene resin (LDPE), medium-density polyethylene resin (MDPE), linear low-density polyethylene resin (LLDPE), ethylene-vinyl acetate copolymer (EVA), ethylene-α-olefin copolymer, ethylene-methacrylic acid resin copolymer, blended resin of polyethylene and polybutene, homopolypropylene resin (PP), propylene-ethylene random copolymer, propylene-ethylene block copolymer, propylene-α-olefin copolymer, and other polypropylene resins.

An adhesive layer 403 can be provided between the sealant layer 402 and the gas barrier layer 410, or between the sealant layer 402 and the paper base material 401. The adhesive layer may be an extruded resin layer or a lamination adhesive. Available as the resin for the extruded resin layer is a polyethylene resin and other thermoplastic resin that is usually 5-20 µm thick. In addition, a urethane two-part curing type dry lamination adhesive (including a solventless adhesive) can be when using an adhesive for laminates. A dry coating amount of 0.5 to 7.0 g/m2 is preferred.

For the purpose of improving preservation of contents, an opaque layer for shielding against ultraviolet rays, such as a colored film, can be provided in the laminate. Alternatively, a gas barrier layer can be provided in the laminate.

Providing a vapor deposited layer of a metal or an inorganic compound on an aluminum and other metal foil or a plastic film on the gas barrier layer 410 enables the same to serve as a gas barrier layer. Examples of the inorganic compound include inorganic compounds such as silicon oxide (SiO) and aluminum oxide (AlO). The gas barrier layer can be laminated by use of an adhesive by, for example, a dry lamination method, or can be laminated by extrusion of a thermoplastic resin by use of an extruder.

On an occasion when the a gas barrier film is used as a gas barrier layer, providing a deposited layer of an inorganic compound and a coating layer on a plastic film can constitute the gas barrier layer. After provision of an anchor coat on the plastic film, the deposited layer and the coating layer should be sequentially provided.

Plastic films that can be used as the gas barrier film include a film of polyethylene terephthalate, nylon, and polypropylene. In particular, a biaxial oriented polyethylene terephthalate film is preferred because the film expands and shrinks little at a time of an evaporation process and a bonding process. A preferred thickness of the film is 6 to 25 µm.

Available as the anchor coat layer of the gas barrier layer is, for example, urethane acrylate. In addition to a coating method by application of a printing technique such as gravure coating of a paint in which resin is dissolved in a solvent, but a commonly known coating method can be also used to form the anchor coat layer.

An exemplary method for forming the deposited layer is a vacuum evaporation method. Using the method can form an SiO, AlO and other inorganic compound layer on a base film provided with an anchor coat layer inorganic compound. In addition, a coating layer of an inorganic compound can be overlaid.

Applying onto a film a coating agent that contains an aqueous solution or a water/alcohol-mixed aqueous solution containing, as a main component, at least one of: a water-soluble polymer; (a) at least one kind of alkoxide or its hydrolyzate, or both thereof; and (b) tin chloride, and heating to dry the coating agent can form an inorganic compound layer. Adding a silane monomer to the coating agent makes it possible to enhance adhesion to the anchor coat layer.

Solely forming a deposited layer by use of a vacuum deposition method provides the inorganic compound layer with gas barrier properties, but accumulating a coating layer of an inorganic compound on the deposited layer formed by use of the vacuum deposition method can form a gas barrier layer.

A dense structure is formed by: creating, by combination of these two layers, a reactive layer for both layers at the interface between the inorganic compound layer formed by the vacuum deposition method and the inorganic compound layer formed by the coating method; or filling and reinforcing any defects or micro pores, such as pinholes, cracks, grain boundaries, that the inorganic compound layer formed by the coating method creates on the inorganic compound layer formed by the vacuum deposition method. The dense structure achieves high gas barrier properties, moisture resistance and water resistance and is flexible enough to withstand deformation, and therefore can be suitable as a packaging material.

On an occasion when SiO is used for the inorganic compound layer, a metal detector or other device can be used as an inspection device, unlike an occasion when a metal foil is used for the gas barrier layer. These devices may be selected and used as appropriate according to applications of and quality standards required of the packaging bag.

An adhesive layer 407 is an adhesive layer for adhering the gas barrier layer 410 to the paper base material 401. These layers may be laminated by a sandwich lamination method by use of a polyolefin resin that is usually 10 to 60 µm thick. A thickness below 10 µm cannot provide sufficient adhesive strength.

More specifically, the adhesive layer 407 is provided by a single resin or a mixture of two or more resins selected from the group consisting of: an ethylene-based resin such as low-density polyethylene and linear low-density polyethylene; polypropylene; an ethylene/α,β-unsaturated carboxylic acid copolymer such as ethylene-acrylic acid copolymer and ethylene-methacrylic acid copolymer (EMAA); an esterified product of an ethylene/α,β-unsaturated carboxylic acid copolymer such as ethylene-methyl acrylate, ethylene-ethyl acrylate, ethylene-methyl methacrylate or ethylene-ethyl methacrylate; an ionically crosslinked product of an ethylene/α,β-unsaturated carboxylic acid copolymer crosslinked with a carboxylic acid part with sodium ion or zinc ion; an acid anhydride-modified polyolefin typified by a terpolymer such as an ethylene-maleic anhydride graft copolymer and ethylene-ethyl acrylate-maleic anhydride; an epoxy compound-modified polyolefin such as methacrylate copolymers; and ethylene-vinyl acetate copolymer.

In order to enhance the adhesive strength, easy adhesion treatment such as corona treatment, ozone treatment, and anchor coating can be applied on a surface of the paper base material or the gas barrier layer.

A thermoplastic resin such as a low-density polyethylene resin and a linear low-density polyethylene resin is preferred as a resin for the thermoplastic resin layer 404 on the outer layer side of the container. The thermoplastic resin layer 404 can be provided by use of these thermoplastic resins on the outer surface of a paper base material by, for example, extrusion lamination.

On the print layer 405 provided on the outer surface of the thermoplastic resin layer, gravure printing, offset printing, gravure offset printing, flexographic printing, ink jet printing, and other printing methods can be used with well-known inks. Printing can display content information and a logo, and can also display an image, an exemplary application, a barcode and others concerning the content as characters and images. It is preferable to apply easy adhesion treatment such as corona treatment onto a surface of the thermoplastic resin layer so as to enhance adhesion to the print layer. An overcoat layer may be provided on the print layer to improve abrasion resistance.

According to the present embodiment, it is thus possible to provide a liquid paper container that is simply structured and easy to disassemble after it is used, the liquid paper container being based on a paper base material.

Third Embodiment

A third embodiment of the present invention will be hereinafter described.

As shown in FIGS. 11A, 11B, 12A, and 12B, laminates 701a, 701b, 701c, or 701d for a liquid paper container of a present invention are formed by a thermoplastic resin layer 601, a paper base material 602, an adhesive resin layer 603, a barrier layer 604, an adhesive layer 605, and a sealant layer 606 laminated sequentially from an outer side to an inner side of the liquid paper container. An ink layer 607 may be provided by printing as required on an outer surface of the thermoplastic resin layer 601.

Figure 11A:
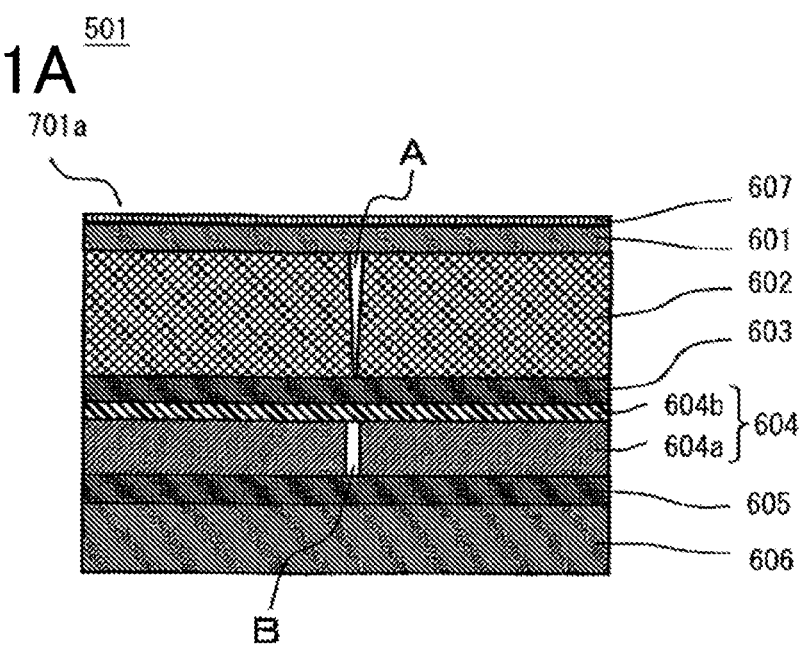
FIG. 11A is a cross-sectional view of an example of a laminate for a liquid paper container of the present invention with deposited layers of a barrier layer being stacked facing a paper base material side.
Figure 11B:
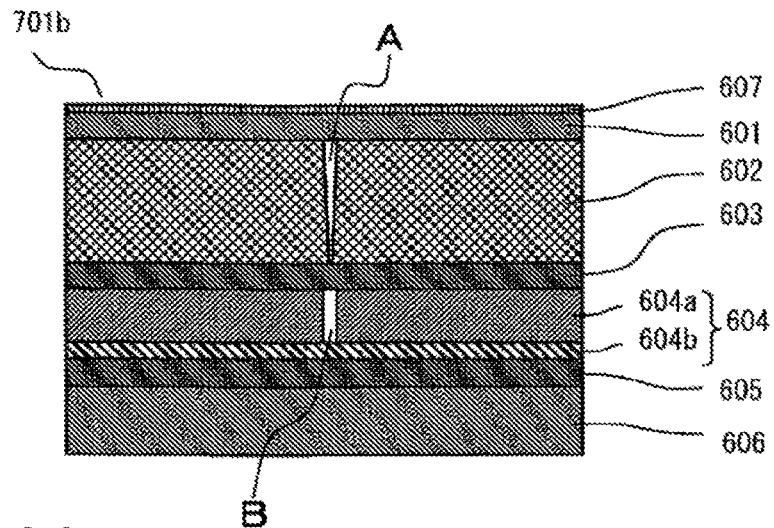
FIG. 11B is a cross-sectional view of an example of a laminate for a liquid paper container of the present invention with deposited layers of a barrier layer being stacked facing a sealant layer side.
Figure 12A:
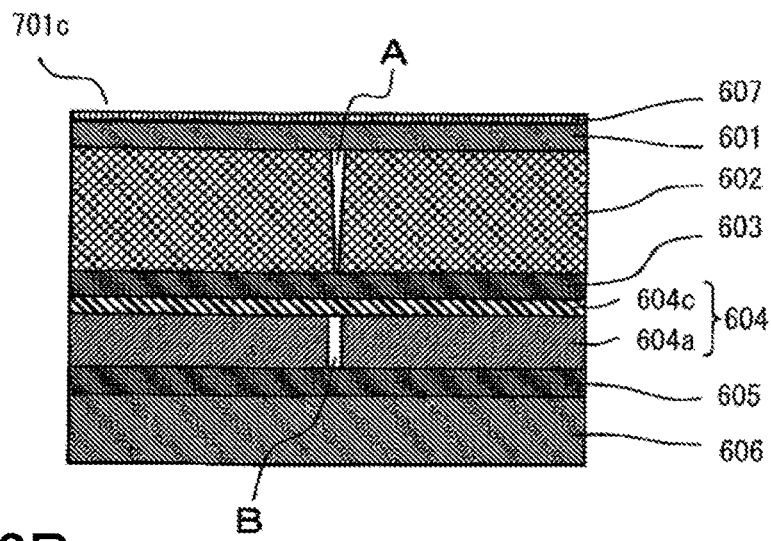
FIG. 12A is a cross-sectional view of another example of a laminate for a liquid paper container of the present invention with metal foils of a barrier layer being stacked facing a paper base material side.
Figure 12B:
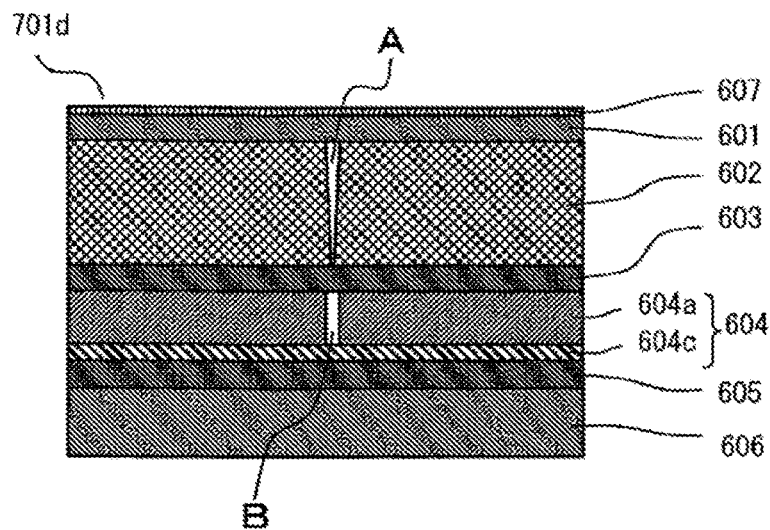
FIG. 12B is a cross-sectional view of another example of a laminate for a liquid paper container of the present invention with metal foils of a barrier layer being stacked facing a sealant layer side.

The barrier layer 604 is a deposited film having a deposited layer 604b provided on a base film 604a as shown in FIGS. 11A and 11B, or a laminate film having a metal foil 604c laminated on the base film 604a as shown in FIGS. 12A and 12B. The deposited layer 604b may be laminated facing the paper base material 2 as shown in FIG. 11A or laminated facing the sealant layer 6 as shown in FIG. 11B. The metal foil 604c may be laminated facing the paper base 2 as shown in FIG. 12A or laminated facing the sealant layer 6 as shown in FIG. 12B.

Then a scored part A is provided on the paper base material 602 and a scored part B is provided on the base film 604a, so that the two scored parts A and B are provided at a substantially identical location in the laminate.

Figure 16:
FIG. 16 is an explanatory view of a shape of a scored part B made on a base film of a barrier layer by use of a laser.
Figure 17:
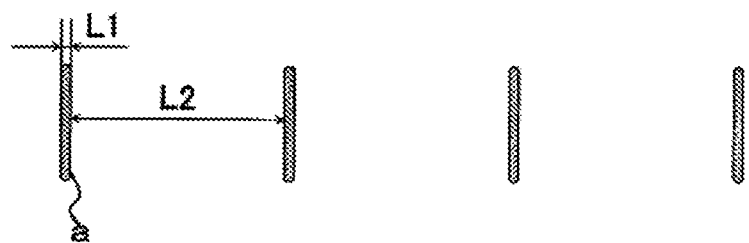
FIG. 17 is an explanatory view of a shape of a scored part B made on a base film of a barrier layer by use of a blade.

The scored part B has a unscored length of below 5.0 mm, preferably below 2.0 mm, and a scoring ratio is above 0% and below 95%, preferably above 0% and below 60%. Assuming that a plurality of scored parts are intermittently aligned on a line as shown in FIGS. 16 and 17, and that the scored length is defined as the length of scoring along an extension of the line, then the unscored length is defined as a length between two adjacent scorings, and the scoring ratio is defined as the scored length×100/(the scored length+the unscored length) (%). A scored length L1 of each scoring may take any value as long as it falls within this range.

Setting the unscored length to less than 5.0 mm and the scoring ratio to more than 0 and less than 95%, as shown in the examples described later can provide good gas barrier properties compared with an occasion when the scored part B is linear. These settings make it possible to disassemble the container from the scored parts A and B well, compared with an occasion when the scored part B is not provided at all.

In addition, setting the unscored length to less than 2.0 mm and the scoring ratio to more than 0 and less than 60%, as shown in the examples described later can provide good gas barrier properties compared with an occasion when the scored part B is linear. These settings make it possible to disassemble the container from the scored parts A and B very well to an extent as good as an occasion when the scored part B is linear.

A thermoplastic resin such as a low-density polyethylene resin (LDPE) or a linear low-density polyethylene resin (LLDPE) is preferred as a resin for the thermoplastic resin layer 601. The thermoplastic resin layer 601 can be provided by use of this thermoplastic resin on the outer surface of a paper base material 602 by extrusion lamination.

Incidentally, the ink layer 607 provided on the outer surface of the thermoplastic resin layer 601 is a layer containing a picture, product information, etc., provided by a method such as gravure printing or offset printing by use of well-known ink. It is preferable to apply easy adhesion treatment such as corona treatment onto the outer surface of the thermoplastic resin layer so as to enhance adhesion to the ink layer 607.

As the paper base material 602, milk carton base paper and other paperboard is usually used. A basis weight and density of the base paper material are appropriately selected according to a capacity and design of the container, but usually paper with a basis weight of 200 to 500 g/m2 and a density of 0.6 to 1.1 g/cm3 is usually preferred.

The adhesive resin layer 603 is a layer made of a polyolefin resin for sandwich lamination for adhering the paper base material 602 and the barrier layer 604. The adhesive resin layer 603 is usually 10-60 μm thick. A thickness of less than 10 μm cannot provide sufficient adhesive strength.

More specifically, the adhesive resin layer 603 is provided by: an ethylene-based resin such as high-density polyethylene (HDPE), medium-density polyethylene (MDPE), low-density polyethylene (LDPE), and linear low-density polyethylene (LLDPE); an ethylene/α,β-unsaturated carboxylic acid copolymer such as ethylene-acrylic acid copolymer (EAA) and ethylene-methacrylic acid copolymer (EMAA); an ionomer, an ionically crosslinked product of an ethylene/α,β-unsaturated carboxylic acid copolymer crosslinked with a carboxylic acid part with sodium ion or zinc ion; and an polyolefin-based resin such as polypropylene (PP).

In order to enhance the adhesive strength, corona treatment, ozone treatment, anchor coating and other treatment may be applied onto the surfaces of the paper base material 602 and the barrier layer 604.

As described above, the barrier layer 604 may be a deposited film in which the deposited layer 604b is provided on the base film 604a. As the deposited layer 604b, metal such as aluminum and tin or deposited silica, alumina and other metal oxide can be used. The deposited layer 604b is preferably 5 to 100 nm thick.

A resin film such as polyethylene terephthalate, nylon, and polypropylene is used as the base film 604a for the deposited film. In particular, a biaxial oriented film of polyethylene terephthalate is preferred because it expands and shrinks little during an evaporation process or a bonding process. A preferred thickness of the film is 6 to 25 μm. On an occasion when a polyethylene terephthalate film is used as the base film 604a and the scored part B is provided on the polyethylene terephthalate film with a laser, however, a polyethylene terephthalate film of a 12 μm thickness is preferred.

In addition, as described above, the barrier layer 604 may be a laminated film in which the metal foil 604c is bonded to the base film 604a. An aluminum foil can be used as the metal foil 604c. The bonding can be carried out by dry lamination. The metal foil 604c is preferably 5 to 15 μm thick.

A resin film that is similar to the base film of the deposited film is used as the base film 604a for the laminate film. In particular, a biaxial oriented film of polyethylene terephthalate is preferred because it expands and shrinks little at a time of a bonding process. A thickness of the base film 604a also similar to that of the base film of the deposited film.

Even if the scored part B is created with a laser after the barrier layer 604 is laminated with the paper base material 602 before the base film 604a, providing the metal deposited layer 604b and the metal foil 604c on a paper base material 2 side from the base film 604a can prevent the metal deposited layer 604b and the metal foil 604c from blocking the laser.

The adhesive layer 605 serves as an adhesive layer for adhering the barrier layer 604, the paper base material 602, and the barrier layer 604 to one another. The adhesive layer 605 may be an extruded resin layer or an adhesive for laminates. Similar to the adhesive resin layer 603, a polyethylene resin or other thermoplastic resin can be used for the extruded resin layer. The adhesive resin layer 605 is usually 5-20 μm thick. In addition, a urethane two-part curing type dry lamination adhesive (including a solventless adhesive) can be used as an adhesive for laminates. A dry coating amount of 0.5 to 7.0 g/m3 is preferred.

Low-density polyethylene (LDPE), linear low-density polyethylene (LLDPE), medium-density polyethylene (MDPE), high-density polyethylene (HDPE) and the like can be used for the sealant layer 606. The sealant layer 606 may partially include a layer containing polybutene. Linear low-density polyethylene is particularly preferred.

Preferred linear low-density polyethylene is of a density of 0.925 or less and an MI of 4 or more. The sealant layer 606 is preferably a 30 to 100-μm-thick non-oriented film formed by a T-die method or an inflation method.

The laminate used in the liquid paper container according to the present embodiment has been described above. In consideration of an application as a liquid paper container, however, the laminate may have a configuration in which another layer is interposed for the purpose of improving the rigidity and durability required as a liquid paper container.

Figure 13A:
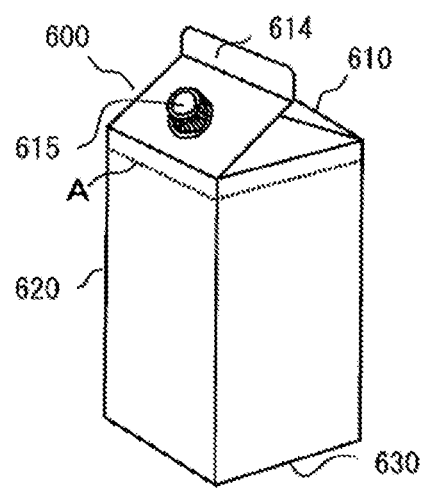
FIG. 13A is a perspective view of an example of a liquid paper container of the present invention.
Figure 13B:
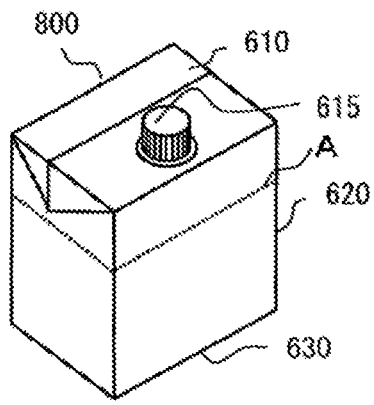
FIG. 13B is a perspective view of another example of a liquid paper container of the present invention.

As shown in FIG. 13A, an example of the liquid paper container according to the present embodiment is a gable-top type liquid paper container 600, which consists of the tubular body part 620 having a part for bonding the body part, a top part 610 for closing an upper end of the body part, and a bottom part 630 for closing a lower end of the body part, and is provided with a spout 615 on the top part 610. Another example of the liquid paper container according to the present embodiment is a brick type liquid paper container 800 having a flat top part as shown in FIG. 13B. Although not shown in the drawings, also acceptable are a liquid paper container having a top part whose front part is inclined and rear part is flat, and a liquid paper container whose top part or bottom part is provided with a top member or a bottom member to provide an annular leg or other part.

A resin for the sealant layer 606 can be also used for the spout 15.

For both of the gable-top type liquid paper container 600 with a spout and the brick type liquid paper container 800 with a spout according to the present embodiment, the scored part A extending substantially all along a periphery of the body part 620 is provided on the paper base material 602, and the scored part B is provided on the base film 604a of the barrier layer 604 at a location substantially identical to the location of the scored part A.

The scored part A may be provided on the top part 610 instead of the body part 620. On an occasion when the scored part A is provided on the top part 610, a single scored part A is horizontally provided on the top part 610, which is in a vicinity of the body part 620, so as to extend all along a periphery of the top part 610 when the paper base material 602 is formed into the liquid paper container 600. A single scored part B is horizontally provided on the base film 604a at the top part 610, which is in the vicinity of the body part 620. The scored part A and the scored part B are resultantly provided at a substantially identical location of the laminate.

Figure 14:
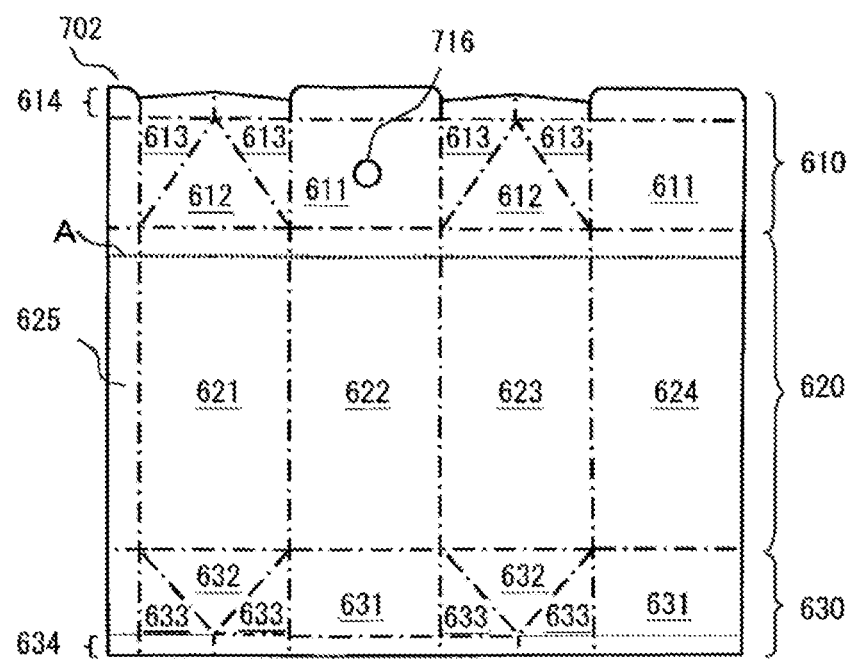
FIG. 14 is a plan view of an example of a blank of a gable-top type liquid paper container with a spout of the present invention as seen from an outside.

The gable-top type liquid paper container 600 with a spout according to the present embodiment is made through the processes of: pressing the folding line shown by a one-dot chain line as shown in FIG. 14 to provide the same; punching the folding line from the laminate to prepare a blank 702; folding the blank 702 along the fold line to assemble the same; and heating to fuse a required part.

On the blank 702 of the gable-top type liquid paper container 600 with a spout according to the present embodiment, four quadrangular face plates, a left face plate 621, a front face plate 622, a right face plate 623, and a rear face plate 624, are continuously provided, and an adhering plate 625 is provided on a left edge of the left face plate 621, as shown in FIG. 14. The adhering plate 625 extends from the top part 610 to the bottom part 630.

A rectangular roof plate 611 is continuously provided above the front plate 622 and the back plate 624, respectively, on the top part 610 above the body part 620. On the roof plate 611 above the front plate 622, a spout aperture 616 for pouring out content is provided in communication with a spout 615.

Triangular infolding pieces 612 are continuously provided above the left side plate 621 and the right side plate 623. The length from the left face plate 621 and the right face plate 623 to an apex of a triangle of an infolding piece 612 is larger than a half of a lateral width of the front face plate 622 and the rear face plate 624. The infolding pieces 612 are formed so that the roof plates 611 do not flatten but form an inclined gable roof at a time when the pieces are folded.

On each of upper two sides of each triangular infolding piece 612, an outfolding piece 613 is continuously provided, and each of the outfolding pieces 613 is respectively connected to the roof plate 611. In addition, a top sealing part 614 is provided above the roof plates 611 and the outfolding pieces 613.

The top sealing parts 614 above the roof plates 611 are formed to be higher than the top sealing parts 614 above the outfolding pieces 613 so as to be directly sealed when the paper container is formed into a box.

The bottom part 630 below the body part 620 has a shape similar to that of the top part 610. Bottom plates 631 are respectively provided continuously below the front plate 622 and the back plate 624, and respectively provided continuously below the left side plate 621 and the right side plate 623 with an apex of each triangular bottom folding piece 632 facing downward.

The length from the left face plate 621 and the right face plate 623 to an apex of the inverted triangle of the bottom folding piece 632 is substantially equal to a half of the lateral width of the front face plate 622 and the rear face plate 624. The folded pieces are formed so that the bottom plates 631 substantially flatten at a time when the pieces are folded.

On each of lower two sides of each triangular bottom folding piece 632, a bottom folding piece 633 is continuously provided, and each of the bottom folding pieces 633 is respectively connected to the bottom plate 631 or the adhering plate 625. In addition, a bottom sealing part 634 is provided below the bottom plates 631 and the bottom folding pieces 633.

Figure 15A:
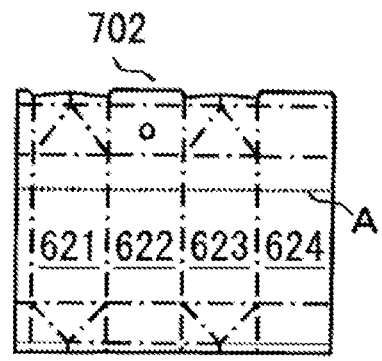
FIG. 15A is an explanatory view schematically illustrating where scoring is provided on a body part of a gable-top type liquid paper container with a spout of the present invention, showing from an outside a location of a scored part A, which is made on a base layer.
Figure 15B:
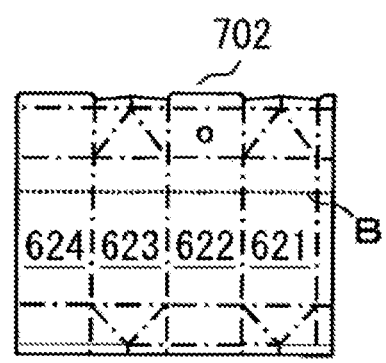
FIG. 15B is an explanatory view schematically illustrating where scoring is provided on a body part of a gable-top type liquid paper container with a spout of the present invention, showing from an inside a location of a scored part B, which is made on a base film of a barrier layer.

As shown in FIGS. 14 and 15A, a single scored part A is horizontally provided on the body part 620 of the paper base material 602, the body part 620 being in a vicinity of the top part 610. As shown in FIG. 15B, a single scored part B is horizontally provided on the base film 604a of the barrier layer 604 of the body part 620, the body part 620 being in the vicinity of the top part 610. The scored part A and the scored part B are provided at a substantially identical location of the laminate.

Figure 15C:
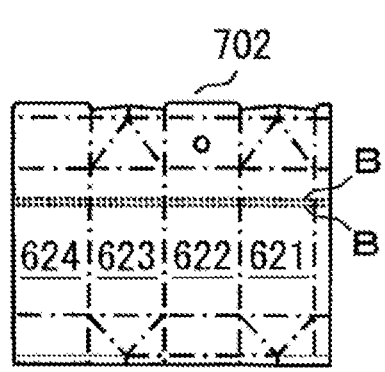
FIG. 15C is an explanatory view schematically illustrating where scoring is provided on a body part of a gable-top type liquid paper container with a spout of the present invention, showing from an inside a location of two scored parts B, which are made on a base film of a barrier layer.

In addition, as shown in FIG. 15C, a plurality of scored parts B may be provided at a location on the base film 604a of the barrier layer 604 of the laminate, the location substantially identical to that of the single scored part A.

Figure 15D:
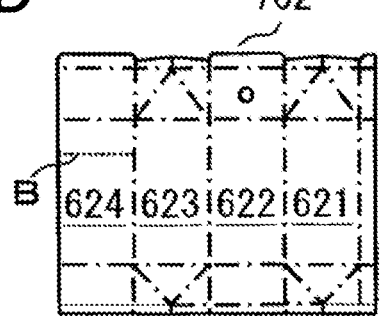
FIG. 15D is an explanatory view schematically illustrating where scoring is provided on a body part of a gable-top type liquid paper container with a spout of the present invention, showing from an inside a location of a scored part B, which is made on a part of a base film of a barrier layer.

In addition, the scored part B does not necessarily have to be provided so as to extend all along a periphery of the body part 620 as the scoring part A does. As shown in FIG. 15D, the scored part B may be provided only on the rear plate 624 that is a face plate attached to an outer side of the adhering plate 625 when the paper container is formed into a box, and a side end face thereof protrudes to the outside. The scored part B may only be at a location substantially identical to that of the scored part A at a time when the paper container starts to be cut in order to be disassembled, and only needs to restrict resistance arising at a time when the paper container starts to be cut.

Although not shown, a plurality of scored parts A and scored parts B may be also provided at a substantially identical location.

The scored part A on the paper base material 602 can be provided by a punching or semi-punching process with a blade die after the laminates are adhered together. A surface of the laminate may be subject to any process of a full cut, a half cut, a half cut perforation, and a full cut perforation until the paper base 602.

In addition, the scored part A of the paper base material 602 can be provided by a punching or semi-punching process with a blade die before lamination of the thermoplastic resin layer 601 on the outer layer side. The thermoplastic resin layer 1 can be then provided by extrusion lamination. The scored part A on the paper base material 602 may be provided by any process of the full cut, the half cut, the half cut perforation, and the full cut perforation.

In this occasion, the scored part A provided on the paper base material 602 is preferably not exposed to an outer surface, nor to water, contamination, etc. from the outside infiltrate thereinto. To match the scored part A with a print, this method involves applying the print to the paper base material 602 or providing a single-colored guideline or register mark at a time of a scoring process in advance before printing on the outer surface of the thermoplastic resin layer 1 in accordance with these indications.

As shown in FIG. 16, the scored part B on the base film 604a can be provided by formation of a plurality of scorings a in a fixed direction by use of a laser. There is no particular restriction on what kind of laser is to be used, but a carbon dioxide gas laser is preferred.

The scored part B on the base film 604a may be also provided by formation of a plurality of scorings a in a lateral direction, a direction in which the scorings a are arranged, with a cutter being set in a longitudinal direction, as shown in FIG. 17. This makes it possible to form a scoring with a scored length L1 being approximately 0 mm.

The scored part B on the base film 604a may be provided before the laminates are adhered together.

On an occasion when the deposited layer 604b is laminated toward the paper base material 602 side as shown in FIG. 11A or the metal foil 604c is laminated toward the paper base material 602 side as shown in FIG. 12 A, the scored part B of the base film 604a can be provided by use of a laser through the sealant layer 606 on the inner layer side after the laminates are adhered together. On this occasion, it is possible to arbitrarily select what kind of intermediate layer is to be scored and to what extent to score the intermediate layer, unless the sealant layer 606 is completely cut.

A carbon dioxide gas laser can provide energy to cut an object at a wavenumber of 880 to 1090 cm-1 when the wavenumber coincides with an absorption peak value of the object. If the base film 604a is made of polyethylene terephthalate, therefore, irradiating the base film 604a with a carbon dioxide gas laser from the sealant layer side will not cause the sealant layer to absorb energy but will cause a polyethylene terephthalate base film 604b to absorb the energy, and as a result makes it possible to provide the scored part B only on the base film 604b.

Making the gable-top type liquid paper container 600 with a spout of the present invention by use of the blank 702 shown in FIG. 14 involves folding the folding line between the left face plate 621 and the front face plate 622 and the folding line between the right face plate 623 and the back face plate 624 into a peak. At this time, fold lines on the top part 610 and the bottom part 630 lying on an extension of these fold lines also are to be mountain-folded.

Then, the front side of the adhering plate 625 is to be sealed to the rear plate 624, the rear sides of the top part 610 and the bottom part 630, which are respectively located above and below the rear plate 624. Note that it is desirable to protect an edge of the adhering plate 625 in advance so that the paper base material 602 will not touch the contents.

To protect the end face, a skive hemming method, which scrapes the outer layer side from the paper base material 2 to leave the sealant layer 606 of the inner layer before folding an unscraped sealant layer 606 side of the inner layer, to the outer layer side, a method of adhering an edge-protection tape so as to cover the end face, and any other method can be used.

After the sealing of the adhering plate 625, the folding line between the front face plate 622 and the right face plate 623 and the fold line lying on an extension thereof are mountain-folded, and the folding line between the adhering plate 625 adhered and the rear face plate 624 and the left face plate 621 and the fold line lying on an extension thereof are mountain-folded to form a quadrangle tubular body part 620 consisting of four face plates: the left face plate 621, the front face plate 622, the right face plate 623, and the rear face plate 624.

A bottom part 630 is then formed. Forming the bottom part 630 follows the steps of: initially folding each bottom folding piece 632 inward along each of folding lines between a bottom folding piece 632 and the left face plate 621 and between another bottom folding piece 632 and the right face plate 623, folding back each bottom folding piece 633 outward along each of folding lines between the bottom folding pieces 633 and the bottom folding pieces 632, mountain-folding each bottom plate 631 along folding lines between a bottom plate 631 and the front face plate 622 and between another bottom plate 631 and the rear plate 624 so that the rear face of each bottom folding pieces 633 is brought into contact with the rear face of each bottom plate 631 so as to face each other, and sealing the bottom sealing part 634.

The next step is to weld a spout 615 from the blank 702, which is shown in FIG. 14, to the spout aperture 616 of the liquid paper container having the body part 620 and the bottom part 630 formed, and fill the liquid paper container with the contents through the spout. The following steps to complete a gable-top type liquid paper container 600 with a spout according to the present invention, as shown in FIG. 13A, the liquid paper container having the top part 610 with a shape of a gable roof and being filled with contents are: folding each infolding piece 612 inward along each of folding lines between an infolding piece 612 and the left face plate 621 and between another infolding piece 612 and the right face plate 623, folding each outfolding piece 613 outward along each of the folding line between the outfolding pieces 613 and the infolding pieces 612, and mountain-folding each roof plate 611 along each of folding lines between a roof plate 611 and the front face plate 622 and between another roof plate 611 and the rear face plate 624 so that the rear face of each outfolding piece 613 will be brought into contact with the rear face of each roof plate 611 so as to face each other, and sealing the top sealing part 614 to form the top part 610.

Figure 18A:
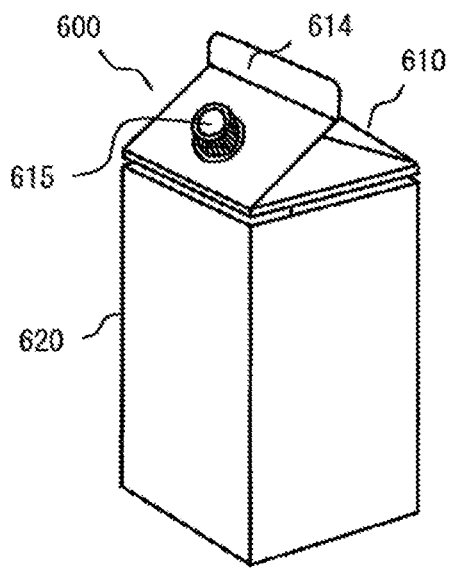
FIG. 18A is a perspective view for describing a cutting and disassembling method on an occasion when scoring is provided on a body part in an example of a liquid paper container of the present invention, showing the liquid paper container being separated by the scoring into an upper part and lower part.

Disposing of the emptied gable-top type liquid paper container 600 with a spout of the present invention follows the steps of: pinching upper and lower parts of the scored part A and the scored part B with left and right hands on an end of the rear plate 624 and the roof plate 611, which are adhered on the adhering plate 625, moving left and right hands in opposite directions to cut the scored part A and the scored part B, and separating the liquid paper container from scored part A and the scored part B into upper and lower parts as shown in FIG. 18A.

Figure 18B:
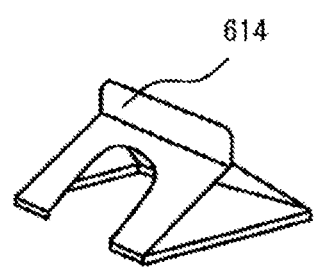
FIG. 18B is a perspective view for describing a cutting and disassembling method on an occasion when scoring is provided on a body part in an example of a liquid paper container of the present invention, showing a part to which a spout is attached being cut away from the upper part by insertion of scissors from under the upper part.
Figure 18B:

Then scissoring the upper part of the separated gable-top type liquid paper container 600 with a spout from beneath can cut off a part to which the spout 615 is attached, as shown in FIG. 18B. Alternatively, providing a U-shaped scored part on the periphery of the spout so as to connect to the scoring provided on the body part can make it possible to remove the spout without scissors.

The part under the scored part A and the scored part B is open at an upper end thereof, so that inserting scissors from the upper end can cut the part open. The part can be then flattened for volume reduction before being disposed of. Alternatively, creating a scoring on the body part vertically and a scoring on the body part in a vicinity of the bottom part such that the scored part may extend all along a periphery of the body part and can cut the body part open without scissors. The part can be then also flattened for volume reduction before being disposed of. On an occasion when a metal foil is not used for the barrier layer 604, the container can be recycled as a paper pack, etc.

Example 1

Packaging containers of a first embodiment according to Examples 1-1 to 1-4 and packaging containers according to Reference Examples 1-1 and 1-2 were made to evaluate whether or not these packaging containers could be disassembled.

A sheet material was prepared in which a print layer, an LDPE (18 μm), a paper base layer (400 g/m2), an EMAA (30 μm), a base film layer (alumina-deposited PET film, 12 μm), and an LLDPE (60 μm) were laminated in the order inward from an outside of the packaging container. The sheet material was then cut into the shape shown in FIG. 3 to prepare a blank of a gable-top type 2000-ml packaging container. In order to form the scored part 207a, a perforation process with a 1-mm cutting length and a 0.5-mm seam length was then carried out, the perforation penetrating the print layer, the LDPE and the paper base layer. A linear scored part 207b that penetrated the base film layer was then formed with a 30 W carbon dioxide laser device. The laser device was set at an irradiation output of 70% and a scan speed of 2500 mm/sec. The scored part 207a was formed at a location of 80 mm away from a vertical upper end of the blank of an upright packaging container. The scored part 207b was formed at a location below the scored part 207a that provided each interval shown in Table 1 (Example 1-1: 0.3 mm, Example 1-2: 0.6 mm, Example 1-3: 0.8 mm, Example 1-4: 1.0 mm, Reference Example 1-1: 1.2 mm, Reference Example 1-2: 1.4 mm) between these scored parts. The packaging containers were made by use of the blanks prepared.

Ten packaging containers made by use of each blank were crushed according to the disassembling method described above so that each fragile part would overlap with one another. Then one round of a 180° mountain-fold followed by a 180° valley-fold was carried out twice before an evaluation was conducted on how easy the fragile part 105 broke. Table 1 also shows the evaluation results. In Table 1, reference symbol "++" indicates that the fragile part 105 easily broke, "+" indicates that the fragile part 105 was subject to a larger resistance but still easily broke, and "−" indicates that the fragile part 105 did not easily break. It turned out that the fragile part 105 easily broke in Examples 1-1 to 1-4 but failed to break or had trouble breaking in Reference Examples 1-1 and 1-2. Incidentally, carrying out three rounds of a 180° mountain-fold followed by a 180° valley-fold the fragile part 105 in Reference Examples 1-1 and 1-2 was able to be broken as well.

TABLE 1

| | Interval between scored part on base material and scored part on film (mm) | Overall evaluation |
|---|---|---|
| Example 1-1 | 0.3 | ++ |
| Example 1-2 | 0.6 | ++ |
| Example 1-3 | 0.8 | ++ |
| Example 1-4 | 1.0 | + |
| Reference Example 1-1 | 1.2 | − |
| Reference Example 1-2 | 1.4 | − |

The evaluation results confirmed that the fragile part 105 easily broke when the scored part 207b was formed in a 2.0-mm-wide virtual band area 209 (1.0 mm vertically) with the scored part 207a being a widthwise center in a plan view of a sheet material 200 or a blank 10.

Example 2

Packaging containers of a first embodiment according to Examples 2-1 to 2-3 and packaging containers according to Reference Examples 2-1 were made to evaluate whether or not these packaging containers could be disassembled.

Of a similar sheet material identical to the one used in Example 1, a blank of a gable-top type 2000-ml packaging container having the following plurality of scored parts 207a and scored parts 207b was made by use of a scored part 207a formed on the paper base layer 202, rather than a scored part 207a being formed on a thermoplastic resin layer 201 and a print layer 208. The blanks according to Examples 2-1 to 2-3 and Reference Example 2-1 have cross sections shown in FIG. 6A, FIG. 6B, FIG. 6C, and FIG. 6D.

Example 2-1

On the blank according to Example 2-1, a single scored part 207a and three scored parts 207b are formed as shown in FIG. 6A. The scored part 207a was formed by a perforation process with a 1-mm cutting length and a 0.5-mm seam. The scored part 207b was formed as perforations with a cutting 0.1-mm length and a 0.4-mm seam with an infrared laser device. Each scored part 207b was provided at a 0.6 mm interval.

Example 2-2

On the blank according to Example 2-2, two scored parts 207a and six scored parts 207b are formed as shown in FIG. 6B. Each scored part 207a was formed by a perforation process with a 1-mm cutting length and a 0.5-mm seam. The scored part 207b was formed with a blade die as perforations with a cutting length of 0.6 mm and a seam of 0.4 mm. Each scored part 207b was spaced at a 1.0 mm interval.

Example 2-3

On the blank according to Example 2-3, one scored part 207a and two scored parts 207b are formed as shown in FIG. 6C. The scored part 207a was formed by a perforation process with a 1-mm cutting length and a 0.5-mm seam. The scored part 207b was linearly formed with an infrared laser device. Each scored part 207b was spaced at a 1.0 mm interval.

Reference Example 2-1

Figure 6D:
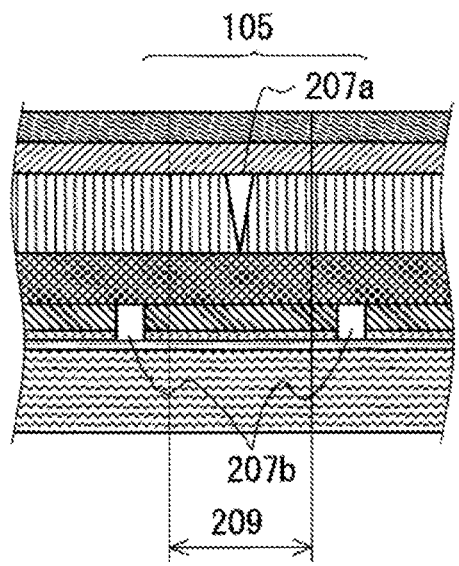
FIG. 6D is a cross-sectional view of a sheet material showing a fragile part according to a reference example.

On the blank according to Reference Example 2-1, a single scored part 207a and two scored parts 207b are formed as shown in FIG. 6D. The scored part 207a was formed by a perforation process with a 1-mm cutting length and a 0.5-mm seam. The scored part 207b was linearly formed with an infrared laser device. Each scored part 207b was provided at a 2.5 mm interval. Both of the two scored parts 207b were formed outside a 2.0-mm-wide band area 209 with the scored part 207a being a widthwise center in a plan view of the sheet material.

Ten packaging containers were made by use of each blank according to the disassembling method described above and an evaluation was conducted on how easy the fragile part 105 broke. Table 2 shows the evaluation results. Reference symbol "+" indicates that the fragile parts 105 of all the ten packaging containers were able to be broken while "−" indicates that the fragile part 105 of at least one of the ten packaging containers did break. The table 2 confirmed that, in Examples 2-1 to 2-3, at least one of the scored parts 207b was formed in a 2.0-mm-wide band area 209 with the scored part 207a being a widthwise center in a plan view of the sheet material and the fragile parts 105 of all the packaging containers easily broke. It also turned out that, in Reference Example 2-1, none of the scored parts 207b was formed in the band area 209 and at least one fragile part 105 failed to break or had trouble breaking.

TABLE 2

| | Interval between scored parts on film (mm) | Evaluation result |
|---|---|---|
| Example 2-1 | 0.6 | + |
| Example 2-2 | 1.0 | + |
| Example 2-3 | 1.0 | + |
| Reference Example 2-1 | 2.5 | − |

The evaluation results described above confirm that, in contrast to an occasion when a single scored part 207b is formed, forming a plurality of scored parts 207b at 2.0 mm or less intervals can form any one of the scored parts 207b in a 2.0-mm-wide band area with the scored part 207a being a widthwise center even if the scored parts 207b are less accurately positioned, which facilitated the breakage of the fragile part 105. Note that carrying out three rounds of a 180° mountain-fold followed by a 180° valley-fold in Reference Examples 2-1 also were able to break the fragile part 105.

Example 3

Packaging containers of a second embodiment according to Examples 3-1 to 3-4 and packaging containers according to Reference Examples 3-1 and 3-2 were made to evaluate whether or not these packaging containers could be disassembled.

Example 3-1

A laminate for a liquid paper container is constituted by: a print layer; a thermoplastic resin layer (18 μm in thickness); a paper base material (400 g/m2); an adhesive layer: EMAA (30 μm in thickness); a gas barrier layer: alumina-deposited polyethylene terephthalate film (12 μm in thickness); a sealant layer: linear low-density polyethylene (60 μm in thickness) in an order from an outside of the liquid paper container toward an inside thereof.

A fragile part was formed by use of this laminate, as in the liquid paper container 501 whose development view is shown in FIG. 10, and a 2000-ml liquid paper container was prepared.

On the low-density polyethylene layer and the paper base material, a scored part as shown in FIG. 7 was formed to ¾ of a paper thickness by one half-blanking operation in a blade cutting process. On the gas barrier layer, one full-blanked scored part was formed in alignment by laser beam machining. The laser irradiation was carried out with a carbon dioxide gas laser device with an irradiation power of 21 W and a processing speed of 150 m/min. Attaching a spout after gluing and molding each part of this blank made a liquid paper container.

The paper base material had a 5.3% moisture percentage at this time. The moisture percentage was measured with a heat dry type moisture meter on a paper base material that was taken out from the liquid paper container under a condition of 200° C., 5 minutes.

After an injection of liquid content to confirm that there is no leakage and other defect, the packaging container was disassembled. Tearing strength of the scored part was also measured.

Example 3-2

Example 3-2 is similar to Example 1 except that the paper base material had a 6.7% moisture percentage.

Example 3-3

Example 3-3 is similar to Example 1 except that the paper base material had a 7.8% moisture percentage.

Example 3-4

Example 3-4 is similar to Example 1 except that the paper base material had an 8.0% moisture percentage.

Reference Example 3-1

Reference Example 3-1 is similar to Example 1 except that the paper base material had a 9.6% moisture percentage.

Reference Example 3-2

Reference Example 3-2 is similar to Example 1 except that the paper base material had a 10.2% moisture percentage.

<Evaluation Items and Evaluation Method>
(Tearing Strength)
Each scored part was folded 180 degrees in both directions once and then measured with a tensile tester at a pulling speed of 200 mm/min.
(Ease of Disassembly)
Ease of disassembly was measured by sensory evaluation. The following reference symbols were used as evaluation criteria: ++: Easily disassemblable, −: Undisassemblable, +: Disassemblable but not easily.

The evaluation results are shown in Table 3.

TABLE 3

| | Moisture percentage of paper (%) | Tearing strength | Evaluation result |
|---|---|---|---|
| Example 3-1 | 5.3 | 15.1 | ++ |
| Example 3-2 | 6.7 | 34.0 | ++ |
| Example 3-3 | 7.8 | 45.8 | ++ |
| Example 3-4 | 8.0 | 52.3 | ++ |
| Reference Example 3-1 | 9.6 | 56.5 | − |
| Reference Example 3-2 | 10.2 | 82.4 | − |

The results shown in Table 3 reveal that the higher the moisture percentage of the paper base material, the higher is the tearing strength. The ease of disassembly determined by the sensory evaluation also finds out that a moisture percentage above 9% disables disassembly, while a moisture percentage below 9% facilitates disassembly. In Reference Examples 3-1 and 3-2, where the moisture percentage exceeded 9%, incidentally, setting the pulling speed of the tensile tester to 150 mm/min after carrying out three rounds of a 180° mountain-fold followed by a 180° valley folding lowered the tearing strength and enabled disassembly.

A demonstration has been successfully made that, according to the present invention, it is possible to provide a liquid paper container that is simply structured and easy to disassemble after it is used, the liquid paper container being based on a paper base material.

Example 4

Packaging containers of a third embodiment according to Examples 4-1 to 4-4 and packaging containers according to Reference Examples 4-1 and 4-4 were made to evaluate whether or not these packaging containers could be disassembled.

Example 4-1

A interior film was prepared by lamination of, through dry-lamination, a polyethylene terephthalate substrate as a base film 4a, an alumina-deposited layer as a deposited layer 604b, a 12-μm-thick alumina-deposited polyethylene terephthalate film as a deposited layer 604b of a barrier layer 604, a 60-μm-thick linear low-density polyethylene resin (LLDPE) layer as a sealant layer 606 via a urethane-based two-component curing type adhesive as an adhesive layer 605.

The scored part B was provided by setting an unscored length L2 to 1.0 mm and setting a scored length L1 to a value that keeps the following formula within a range between substantially 0% and 60%: the scoring ratio=the scored length L1×100/(the scored length L1+the unscored length L2), and forming a plurality of scoring a on the base film 604a in a fixed direction from the base film 604a side of the barrier layer 604 of the interior film. At that time, on an occasion of forming a scoring a whose scoring ratio is substantially 0%, that is, the scored length L1 is substantially 0 mm, a cutter was placed orthogonally to a direction in which the scoring a is arranged, and the scoring a was provided as shown in FIG. 17. On an occasion of formation of a scoring a whose scoring ratio is above substantially 0% and below 60%, a carbon dioxide laser device with an average output of 30 W was set at an irradiation output of 70% and a scan speed of 2500 mm/sec, and the scoring a was provided as shown in FIG. 16.

A paperboard having a basis weight of 400 g/m2 was prepared for a paper base material 602. An ethylene-methacrylic acid copolymer resin (EMMA) was then extruded from a T die to provide a 30 μm thick adhesive resin layer 603 on one side of the paper base material 602. A base film layer 604c side face of the barrier layer 604 of the interior film was then crimped onto a molten resin surface of the adhesive resin layer 603 to bond the paper base material 602 and the interior film.

A full-cut perforation was formed to provide the scored part A by a punching process by use of a bladed roll, a punching process onto the paper base material 602 from a paper base material 602 side of the lamination produced by the paper base material 602 and the interior film being pasted to each other, the full-cut perforation having alternately and continuously arranged 1-mm-long cut lines and 0.5-mm-long seams.

Subsequently, low-density polyethylene (LDPE) was extruded as a thermoplastic resin layer 601 from the T die onto the surface opposite to the surface on which the interior film of the paper base material 602 was bonded. The extruded LDPE was laminated to be 18 μm thick.

In addition, corona treatment was applied onto an outer surface of the thermoplastic resin layer 601 immediately after the lamination of the thermoplastic resin layer 601. Then, an ink layer 607 serving as a pattern was provided on the corona-treated surface of the thermoplastic resin layer 601 by use of a printing machine to produce a laminate 701b as shown in FIG. 11B.

The laminate 701b was then punched to form a blank 702 shown in FIG. 14. At that time, the scored part A and the scored part B were punched so as to be located at a distance of 80 mm from a roof plate 611 or an infolding piece 612.

Then, as described above, a body part 620 was formed from the blank 702 through a side pasting process for sealing a front side of an adhering plate 625 to a rear plate 624 and to rear sides of the top part 610 and the bottom part 630 located above and below the rear plate 624. A bottom part 630 was subsequently formed before a spout 615 was welded to the plug hole 616, and contents were poured into the body part 620*a*.

Lastly, as described above, a top part 610 was formed to produce a hermetically sealed 2000-ml container, a gable-top type liquid paper container 600 with a spout of Example 4-1.

Example 4-2

A plurality of scorings a were formed in a fixed direction from a base film 604*a* side of the barrier layer 604 of the interior film to the base film 604*a* by use of a carbon dioxide gas laser device with an average output of 30 W to assemble a gable-top type liquid paper container 600 with a spout of Example 4-2, which was similar to that of Example 4-1 except that a scored part B was provided, the carbon dioxide gas laser device being set with an irradiation output at 70% and a scan speed at 2500 mm/sec, each of the scorings a having a 1.0-mm-long unscored length L2 and a scored length L1 value that causes a scoring ratio to be within a range over 60% and below 90%, the scoring ratio being calculated by a formula: the scored length L1×100/(the scored length L1+the unscored length L2) as shown in FIG. 16.

Reference Example 4-1

A plurality of scorings a were formed in a fixed direction from a base film 604*a* side of the barrier layer 604 of the interior film to the base film 604*a* by use of a carbon dioxide gas laser device with an average output of 30 W to assemble a gable-top type liquid paper container 600 with a spout of Reference Example 4-1, which was similar to that of Example 4-1 except that a scored part B was provided, the carbon dioxide gas laser device being set with an irradiation output at 70% and a scan speed at 2500 mm/sec, each of the scorings a having a 1.0-mm-long unscored length L2 and a scored length L1 value that causes a scoring ratio to be over 95%, the scoring ratio being calculated by a formula: the scored length L1×100/(the scored length L1+the unscored length L2) as shown in FIG. 16.

Example 4-3

A plurality of scorings a were formed in a fixed direction from a base film 604*a* side of the barrier layer 604 of the interior film to the base film 604*a* by use of a carbon dioxide gas laser device with an average output of 30 W to assemble a gable-top type liquid paper container 600 with a spout of Example 4-3, which was similar to that of Example 4-1 except that a scored part B was provided, the carbon dioxide gas laser device being set with an irradiation output at 70% and a scan speed at 2500 mm/sec, each of the scorings a having a unscored length L2 that is less than 2.0 mm long and a scored length L1 value that causes a scoring ratio to be 10%, the scoring ratio being calculated by a formula: scored length L1×100/(scored length L1+unscored length L2) as shown in FIG. 16.

Example 4-4

A plurality of scorings a were formed in a fixed direction from a base film 604*a* side of the barrier layer 604 of the interior film to the base film 604*a* by use of a carbon dioxide gas laser device with an average output of 30 W to assemble a gable-top type liquid paper container 600 with a spout of Example 4-4, which was similar to that of Example 4-1 except that a scored part B was provided, the carbon dioxide gas laser device being set with an irradiation output at 70% and a scan speed at 2500 mm/sec, each of the scorings a having a unscored length L2 that is less than 2.0 or greater and less than 5.0 mm long and a scored length L1 value that causes a scoring ratio to be 10%, the scoring ratio being calculated by a formula: scored length L1×100/(scored length L1+unscored length L2) as shown in FIG. 16.

Reference Example 4-2

A plurality of scorings a were formed in a fixed direction from a base film 604*a* side of the barrier layer 604 of the interior film to the base film 604*a* by use of a carbon dioxide gas laser device with an average output of 30 W to assemble a gable-top type liquid paper container 600 with a spout of Reference Example 4-2, which was similar to that of Example 4-1 except that a scored part B was provided, the carbon dioxide gas laser device being set with an irradiation output at 70% and a scan speed at 2500 mm/sec, each of the scorings a having a unscored length L2 that is over 5.0 mm long and a scored length L1 value that causes a scoring ratio to be 10%, the scoring ratio being calculated by a formula: scored length L1×100/(scored length L1+unscored length L2) as shown in FIG. 16.

Reference Example 4-3

A gable-top type liquid paper container 600 with a spout of Reference Example 4-3 was assembled on a base film 604*a* of a barrier layer 604 of an interior film, which was similar to that of Example 4-1 except that a scored part B was provided.

Reference Example 4-4

A gable-top type liquid paper container 600 with a spout of Reference Example 4-4 was assembled from a base film 604*a* side of a barrier layer 604 of an interior film to a base film 604*a* by use of a carbon dioxide gas laser device with an average output of 30 W, which was similar to that of Example 4-1 except that a linear scored part B was provided, the carbon dioxide gas laser device being set with an irradiation output at 70% and a scan speed at 2500 mm/sec.

[Evaluation] For the gable-top type liquid paper container 600 with a spout of each of Examples 4-1 to 4-4 and Reference Examples 4-1 to 4-4, an evaluation was made on oxygen barrier properties and separability from the scored part A and the scored part B.

To evaluate the oxygen barrier properties, the container was placed in an environment at a temperature of 23° C. and a relative humidity of 60% Rh, and oxygen permeability (unit: cc/pkg/day) was measured.

Regarding the separability from the scored part A and the scored part B, a container that 80% or more of 30 adult male and 30 adult female subjects were able to easily disassemble was evaluated as reference symbol "++", a container that less than 80% of the subjects were able to disassemble was evaluated as "−", and a container that 80% or more of the subjects were able to disassemble but struggled to disassemble was evaluated as "+".

Regarding a comprehensive evaluation, a container whose oxygen permeability was 0.16, which is identical to the value in Reference Example 4-3, where no scored part B was provided, and whose separability from the scored part A and scored part B was "++" was evaluated as "++", a container whose oxygen permeability was larger than 0.16, which is the value in Reference Example 4-3, where no scored part B was provided, and less than 0.21, which is the value in Reference Example 4-4, where linear scored parts B were provided or whose separability from the scored part A and scored part B was evaluated as "+", and a container whose oxygen permeability was 0.21, which is the value in Reference Example 4, where linear scored parts B were provided or whose separability from the scored part A and scored part B was – was evaluated as "–".

The evaluation results are shown in Table 4.

TABLE 4

| | Scored part B | | Oxygen transmission rate of Container | Separability from scored part A and scored part B | |
|---|---|---|---|---|---|
| | Unscored length (mm) | Scoring ratio (%) | (cc/pkg/day) (23° C., 60% RH) | (sensory evaluation) | Overall evaluation |
| Example 4-1 | 1.0 | approx. over 0 and below 60 | 0.16 | ++ | ++ |
| Example 4-2 | 1.0 | Over 60 and below 95 | 0.17-0.20 | ++ | + |
| Reference Example 4-1 | 1.0 | Over 95 | 0.21 | ++ | – |
| Example 4-3 | Below 2.0 | 10 | 0.16 | ++ | ++ |
| Example 4-4 | Over 2.0 and below 5.0 | 10 | 0.16 | + | + |
| Reference Example 4-2 | Over 5.0 | 10 | 0.16 | – | – |
| Reference Example 4-3 | No scoring | 0 | 0.16 | – | – |
| Reference Example 4-4 | Linear scoring | 100 | 0.21 | ++ | – |

As is apparent from Table 4, a less than 5.0 mm unscored length and a higher than 0% and lower than 95% scored part ratio provide an oxygen permeability that is lower than 0.21 cc/pkg/day and an oxygen barrier property that is better than that in Reference Example 4-4, where linear scored parts B are provided. In addition, the length and ratio makes it possible for more than 80% of the subjects to disassemble the container, though not necessarily easily, and also provide a separability from the scored part A and the scored part that is better than that in Reference Example 4-3, where no scored part B is provided.

As is apparent from Table 4, a less than 2.0 mm unscored length and a higher than 0% and lower than 60% scored part ratio provide a 0.16 cc/pkg/day oxygen permeability, an oxygen barrier property that is better than that in Reference Example 4-3, where no linear scored part B is provided. In addition, the length and ratio makes it possible for more than 80% of the subjects to easily disassemble the container, and also provide a separability from the scored part A and the scored part that is as good as that in Reference Example 4-4, where linear scored parts B are provided. Incidentally, carrying out three rounds of a 180° mountain-fold followed by a 180° valley-fold as shown in FIG. 2B were able to break the fragile part 105 in Reference Examples 4-2 and 4-3 as well.

The present embodiment can improve the gas barrier property over an occasion when the scored parts B are linearly provided.

The present invention is not limited to the embodiments described above, but can be practiced in various manners. For example, a layer configuration is not limited to the examples described above, but the present invention can be applied to a laminate made of a base layer and a film layer. In addition, features of each embodiment can be combined or modified as appropriate.

INDUSTRIAL APPLICABILITY

The present invention is useful for paper packaging containers, etc. for storing liquid and the like.

REFERENCE SIGNS LIST

1 . . . Packaging container; 10, 20, 30 . . . Blank; 100, 200, 300 . . . Container body; 101 . . . Top part; 102 . . . Body part; 103 . . . Bottom part; 104 . . . Spout plug; 104 . . . Spout; 104*b* . . . Cap; 105 . . . Fragile part; 106 . . . Roof plate; 107 . . . Infolding plate; 108 . . . Outfolding plate; 109 . . . Side plate; 110 . . . Bottom surface plate; 111 . . . Sealing part; 112 . . . Spout aperture; 113 . . . Cutting-start part; 200 . . . Sheet material; 201 . . . Thermoplastic resin layer; 202 . . . Paper base layer; 203 . . . Adhesive resin layer; 204 . . . Barrier layer; 204*a* . . . Base film; 204*b* . . . Deposited layer; 204*c* . . . Metal foil; 205 . . . Adhesive layer; 206 . . . Sealant layer; 207*a*, 207*b* . . . Scored part; 208 . . . Print layer; 209 . . . Band area; 401 . . . Paper base material; 402 . . . Sealant layer; 403 . . . Adhesive layer; 404 . . . Thermoplastic resin layer; 405 . . . Print layer; 406 . . . Scored part; 407 . . . Adhesive layer; 408 . . . Plastic film; 409 . . . Inorganic compound layer; 410 . . . Gas barrier layer; 411 . . . Scored part; 420 . . . Spout; 421 . . . Top sealing part; 422 . . . Body part; 423 . . . Top part; 424 . . . Bottom part; 425 . . . Adhesive plate; 426 . . . Fragile part; 427 . . . Folding line; 500 . . . Laminate; 501 . . . Liquid paper container; 601 . . . Thermoplastic resin layer; 602 . . . Paper base material; 603 . . . Adhesive resin layer; 604 . . . Barrier layer; 604*a* . . . Base film; 604*b* Deposited layer; 604*c* . . . Metal foil; 605 . . . Adhesive layer; 606 . . . Sealant layer; 607 . . . Ink layer; 610 . . . Top part; 611 . . . Shingles; 612 . . . Infolding piece; 613 . . . Outfolding piece; 614 . . . Top sealing part; 615 . . . Spout; 616 . . . Spout aperture; 620 . . . Body part; 621 . . . Left side plate; 622 . . . Front plate; 623 . . . Right side plate; 624 . . . Rear plate; 625 . . . Adhering plate; 630 . . . Bottom part; 631 . . . Bottom plate; 632 . . . Bottom infolding piece; 633 . . . Bottom outfolding piece; 634 . . . Bottom sealing part; 600 . . . Gable-top type liquid paper container with a spout; 701*a*, 701*b*, 701*c*, 701*d* . . . Laminate; 702 . . . Blank; 800 . . . Brick type liquid paper container with a spout; a . . . Scored part location; A, B . . . Scored part; L1 . . . Scored length; L2 Unscored length

What is claimed is:

1. A packaging container formed by folding a laminate including a base layer into a box shape and overlapping to seal end parts thereof, wherein a fragile part is formed in the laminate, wherein a first scored part is formed on the base layer as the fragile part, wherein the laminate has a film layer on an inner side of the packaging container relative to the base layer, and a second scored part is further formed as the fragile part on the film layer in a 2.0-mm-wide band area with the first scored part being a widthwise center in a plan view of the laminate, wherein an unscored length is below 2.0 mm and a scoring ratio is below 60% when: a scored length is defined as a length of the second scored part along an extending direction of a line on which a plurality of scorings are intermittently arranged; the unscored length is defined as a distance between two scorings; and the scoring ratio is defined as the scored length×100/(the scored length+ the unscored length).

2. The packaging container of claim 1, wherein the base layer is paper, and a moisture percentage of the paper is below 9%.

3. The packaging container of claim 1, wherein the first scored part is formed by a laser beam machining process or a semi-punching process and full-punching process by use of a blade die.

4. The packaging container of claim 1, wherein the film layer has a gas barrier layer formed by provision of an inorganic compound layer on a plastic film.

5. The packaging container of claim 1, wherein the film layer has a gas barrier layer made of a metal foil.

6. The packaging container of claim 1, wherein the second scored part is formed by a laser beam machining process or a semi-punching process or full-punching process by use of a blade die.

7. The packaging container of claim 1, wherein an extending direction of each scoring of the second scored parts is formed vertically to an extending direction of the line.

\* \* \* \* \*